US012706014B2

(12) United States Patent
Chen et al.

(10) Patent No.: US 12,706,014 B2
(45) Date of Patent: Aug. 11, 2026

(54) DISPLAY APPARATUS, CONTROL METHOD, ELECTRONIC DEVICE, AND COMPUTER-READABLE STORAGE MEDIUM

(71) Applicants: Beijing BOE Display Technology Co., Ltd., Beijing (CN); BOE Technology Group Co., Ltd., Beijing (CN)

(72) Inventors: Dongchuan Chen, Beijing (CN); Dong Liu, Beijing (CN); Xibin Shao, Beijing (CN); Yanping Liao, Beijing (CN); Yinlong Zhang, Beijing (CN); Pengfei Hu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 19/108,348

(22) PCT Filed: May 24, 2024

(86) PCT No.: PCT/CN2024/095214
§ 371 (c)(1),
(2) Date: Mar. 3, 2025

(87) PCT Pub. No.: WO2025/241184
PCT Pub. Date: Nov. 27, 2025

(65) Prior Publication Data

US 2025/0363927 A1 Nov. 27, 2025

(51) Int. Cl.
*G09G 3/20* (2006.01)

(52) U.S. Cl.
CPC ......... *G09G 3/20* (2013.01); *G09G 2310/027* (2013.01); *G09G 2310/0291* (2013.01); *G09G 2360/121* (2013.01)

(58) Field of Classification Search
CPC ..... G09G 2310/027; G09G 2310/0291; G09G 2360/121; G09G 3/20
See application file for complete search history.

(56) References Cited

U.S. PATENT DOCUMENTS 6,448,976 B1 9/2002 Nitta et al.
11,011,094 B1 * 5/2021 Chen ........................ G09G 3/20
(Continued)

FOREIGN PATENT DOCUMENTS

CN 1080077 A 12/1993
CN 100501543 C 6/2009
(Continued)

OTHER PUBLICATIONS

CN114519967A Source driving device, control method thereof and display system (Year: 2022).*
(Continued)

*Primary Examiner* — Van N Chow
(74) *Attorney, Agent, or Firm* — Banner & Witcoff, Ltd.

(57) ABSTRACT

A display apparatus, control method, electronic device, and computer-readable storage medium are provided. The display apparatus includes a display substrate and a source driver. The display substrate includes a plurality of data signal lines, and the source driver includes a first cache module, a second cache module, an operation conversion module, and an output module. The first cache module includes M first cache units for caching N initial data at intervals. The second cache module includes M second cache units. The operation conversion module is configured to send P initial data to corresponding P second cache units according to the control signal, calculate (M-P) interpolation data based on Q initial data, and send (M-P) interpolation data to (M-P) second cache units other than P second cache units. The output module is configured to output M data
(Continued)

cached by M second cache units to a plurality of data signal lines.

19 Claims, 13 Drawing Sheets

(56) References Cited

U.S. PATENT DOCUMENTS

| | | | | |
|---|---|---|---|---|
| 12,475,850 | B2 * | 11/2025 | Seo | G09G 3/3233 |
| 2019/0244588 | A1 * | 8/2019 | Yang | G09G 5/391 |
| 2021/0358357 | A1 * | 11/2021 | Huang | G02F 1/136286 |
| 2022/0122506 | A1 * | 4/2022 | Gao | G09G 3/20 |
| 2023/0206821 | A1 * | 6/2023 | Gu | G09G 3/2096 345/213 |
| 2025/0078728 | A1 * | 3/2025 | Tian | G09G 3/20 |

FOREIGN PATENT DOCUMENTS

| | | | |
|---|---|---|---|
| CN | 103778888 | A | 5/2014 |
| CN | 106597773 | A | 4/2017 |
| CN | 107680550 | A | 2/2018 |
| CN | 107742504 | A | 2/2018 |
| CN | 109817150 | A | 5/2019 |
| CN | 113963648 | A | 1/2022 |
| CN | 114387909 | A | 4/2022 |
| CN | 114519967 | A | 5/2022 |
| JP | 2002359856 | A | 12/2002 |
| WO | 2023206101 | A1 | 11/2023 |

OTHER PUBLICATIONS

Source driving device, control method thereof and display (Year: 2022).*

* cited by examiner

DISPLAY APPARATUS, CONTROL METHOD, ELECTRONIC DEVICE, AND COMPUTER-READABLE STORAGE MEDIUM

The present application is a national phase application of International Patent Application No. PCT/CN2024/095214, filed on May 24, 2024. The aforementioned patent application is hereby incorporated by reference in its entireties.

TECHNICAL FIELD

Embodiments of the present disclosure relate to a display apparatus, a control method for a display apparatus, an electronic device, and a computer-readable storage medium.

BACKGROUND

With the development of display industry and the improvement of people's material level, display systems using display panels as display ports have been increasingly integrated into people's daily life, and have the advantages of small size, low power consumption, no radiation, low manufacturing cost and the like.

SUMMARY

At least one embodiment of the present disclosure provides a display apparatus, comprising a display substrate and a source driver. The display substrate comprises multiple rows and columns of sub-pixels arranged in an array, a plurality of gate scanning signal lines, and a plurality of data signal lines; and a source driver. The source driver comprises a first cache module, a second cache module, an operation conversion module, and an output module. The first cache module comprises M first cache units configured to cache N pieces of initial data at intervals, each piece of the initial data corresponds to one of the data signal lines; the second cache module comprises M second cache units in one-to-one correspondence to the M first cache units; the operation conversion module is connected between the first cache module and the second cache module and is configured to send P pieces of initial data among the N pieces of initial data to P corresponding second cache units, calculate (M-P) pieces of interpolation data based on Q pieces of initial data among the N pieces of initial data and send the (M-P) pieces of interpolation data to (M-P) second cache units other than the P second cache units; and the output module is configured to output M pieces of data cached by the M second cache units to the plurality of data signal lines; where M is a positive integer greater than 2, N is a positive integer less than M, and both P and Q are positive integers less than or equal to N.

For example, in the display apparatus provided by at least one example of the embodiment of the present disclosure, the operation converter comprises M first switches, K second switches, and K operation units; inputs of the M first switches are connected to outputs of the M first cache units, respectively, output of each of the first switches is connected to one second cache unit and at least one operation unit, and each of the first switches is configured to: according to a control signal, turn off output of a connected first cache unit, or output data of the first cache unit to a connected second cache unit, or output the data of the first cache unit to a connected operation unit; input of each of the operation units is connected to outputs of at least two first switches, and outputs of the K operation units are connected to inputs of the K second switches, respectively; and output of each of the second switches is connected to two second cache units, and each of the second switches is configured to: according to a control signal, turn off output of a connected operation unit, or output data of the connected operation unit to one of the two connected second cache units; where K is a positive integer less than M.

For example, in the display apparatus provided by at least one example of the embodiment of the present disclosure, each row of the multiple rows and columns of sub-pixels comprises sub-pixels of multiple colors, and the sub-pixels of multiple colors are cyclically arranged; every two gate scanning signal lines among the plurality of gate scanning signal lines connect one row of sub-pixels, and each of the plurality of data signal lines connects two columns of sub-pixels; and two sub-pixels connected to a same data signal line and connected to two adjacent gate scanning signal lines respectively are sub-pixels of different colors.

For example, in the display apparatus provided by at least one example of the embodiment of the present disclosure, the multiple rows and columns of sub-pixels comprise an ith row of sub-pixels, and the source driver further comprises a data module configured to: obtain a first group of initial data and a second group of initial data obtained based on multiple pieces of initial data corresponding to the ith row of sub-pixels, the first group of initial data corresponds to a first part of sub-pixels in the ith row of sub-pixels, the second group of initial data corresponds to a second part of sub-pixels in the ith row of sub-pixels, and the first part of sub-pixels comprises sub-pixels of a first color and sub-pixels of a second color, the second part of sub-pixels comprises sub-pixels of the second color and sub-pixels of a third color, and each group of the first group of initial data and the second group of initial data comprises the N pieces of initial data; output the first group of initial data to the first cache module at a first moment, so that the first cache module caches the first group of initial data; and output the second group of initial data to the first cache module at a second moment, so that the first cache module caches the second group of initial data; where i is a positive integer.

For example, in the display apparatus provided by at least one example of the embodiment of the present disclosure, every two pieces of initial data among the N pieces of initial data are stored as a subgroup in two adjacent first cache units, and one first cache unit is spaced between every two subgroups; the jth operation unit in the K operation units is connected to the jth first switch and the (j+3)th first switch; and the jth second switch connected to the jth operation unit is connected to the (j+1)th second cache unit and the (j+2)th second cache unit; where j=1, 2, 3, . . . , K.

For example, in the display apparatus provided by at least one example of the embodiment of the present disclosure, the source driver further comprises a controller configured to: in the process of processing the first group of initial data, control the operation conversion module to output two pieces of initial data in each subgroup to two corresponding second cache units; and control the operation conversion module to calculate a piece of interpolation data based on the first piece of data in every two adjacent subgroups to obtain multiple pieces of interpolation data and output the multiple pieces of interpolation data to other second cache units.

For example, in the display apparatus provided by at least one example of the embodiment of the present disclosure, the K operation units comprise at least one first operation unit and at least one second operation unit, each first operation unit is configured to process the first piece of initial data in two adjacent subgroups, and each second operation unit is configured to process the second piece of initial data in two adjacent subgroups; the controller is further configured to: in the process of processing the first group of initial data, control part of first switches among the M first switches to output two pieces of initial data in each subgroup to two corresponding second cache units and output the first piece of initial data in every two adjacent subgroups to the connected first operation unit, so as to calculate interpolation data by the first operation unit; control a second switching unit connected to each first operation unit to output the interpolation data calculated by the first operation unit to the latter one of two second cache units connected to the second switching unit; and control a second switching unit connected to each second operation unit to turn off the output of the second operation unit.

For example, in the display apparatus provided by at least one example of the embodiment of the present disclosure, the controller is further configured to: in the process of processing the second group of initial data, control the operation conversion module to output the first piece of initial data in each subgroup to one corresponding second cache unit; calculate a piece of interpolation data based on the first piece of initial data in every two adjacent subgroups and output this piece of interpolation data to one second cache unit; and calculate a piece of interpolation data based on the second piece of initial data in every two adjacent subgroups and output this piece of interpolation data to one second cache unit.

For example, in the display apparatus provided by at least one example of the embodiment of the present disclosure, the K operation units comprise at least one first operation unit and at least one second operation unit, each first operation unit is configured to process the first piece of initial data in two adjacent subgroups, and each second operation unit is configured to process the second piece of initial data in two adjacent subgroups; the controller is further configured to: in the process of processing the second group of initial data, control part of first switches among the M first switches to: output the first piece of initial data in each subgroup to one corresponding second cache unit, output the first piece of initial data in every two adjacent subgroups to the connected first operation unit, and output the second piece of initial data in every two adjacent subgroups to the connected second operation unit; control a second switching unit connected to each first operation unit to output the interpolation data calculated by the first operation unit to the former one of two second cache units connected to the second switching unit; and control a second switching unit connected to each second operation unit to output the interpolation data calculated by the second operation unit to the latter one of two second cache units connected to the second switching unit.

For example, in the display apparatus provided by at least one example of the embodiment of the present disclosure, the multiple rows and columns of sub-pixels further comprise the (i+r)th row of sub-pixels, the first sub-pixel and the second sub-pixel in the ith row of sub-pixels are connected to the first data signal line, and the first sub-pixel and the second sub-pixel in the (i+r)th row of sub-pixels are connected to the second data signal line. The source driver is configured to: in the process of processing initial data corresponding to the ith row of sub-pixels, cache the N pieces of initial data from the first one of the M first cache units; and in the process of processing initial data corresponding to the (i+r)th row of sub-pixels, cache the N pieces of initial data from the second one of the M first cache units; where r is a positive integer.

For example, in the display apparatus provided by at least one example of the embodiment of the present disclosure, the output module comprises: a digital-to-analog (DA) converter and an amplifier. The digital-to-analog converter is configured to convert signals corresponding to the M pieces of data into analog driving signals; and the amplifier is configured to amplify the analog driving signals and then output them to the plurality of data signal lines.

At least one embodiment of the present disclosure provides an electronic device, comprising the display apparatus according to any embodiment of the present disclosure.

At least one embodiment of the present disclosure provides a control method for a display apparatus, the display apparatus comprises a display substrate and a source driver; the display substrate comprises multiple rows and columns of sub-pixels arranged in an array, a plurality of gate scanning signal lines, and a plurality of data signal lines; the source driver comprises M first cache units and M second cache units in one-to-one correspondence to the M first cache units; and the method comprises: controlling the source driver to cache N pieces of initial data into the M first cache units, each piece of the initial data corresponds to one of the data signal lines, and the N pieces of initial data are stored in the M first cache units at intervals; controlling the source driver to send P pieces of initial data among the N pieces of initial data to P second cache units among the M second cache units, calculating (M-P) pieces of interpolation data based on Q pieces of initial data among the N pieces of initial data, and sending the (M-P) pieces of interpolation data to (M-P) second cache units other than the P second cache units; and controlling the source driver to output M pieces of data cached by the M second cache units to the plurality of data signal lines.

At least one embodiment of the present disclosure provides an electronic device, comprising: a processor; and a memory including one or more computer program modules stored thereon; the one or more computer program modules are configured to be executed by the processor to implement the control method according to any embodiment of the present disclosure.

At least one embodiment of the present disclosure provides a computer-readable storage medium including non-transitory computer-readable instructions stored thereon that can implement the control method according to any embodiment of the present disclosure upon being executed by a computer.

BRIEF DESCRIPTION OF DRAWINGS

In order to explain the technical solutions in the embodiments of the present disclosure more clearly, the drawings of the embodiments will be briefly described below. Apparently, the drawings in the following description only involve some embodiments of the present disclosure and are not intended to limit the present disclosure.

DETAILED DESCRIPTION

To make the objective, technical solutions, and advantages of the embodiments of the present application more clearly, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any creative work, which should be within the scope of the disclosure.

Figure 1:
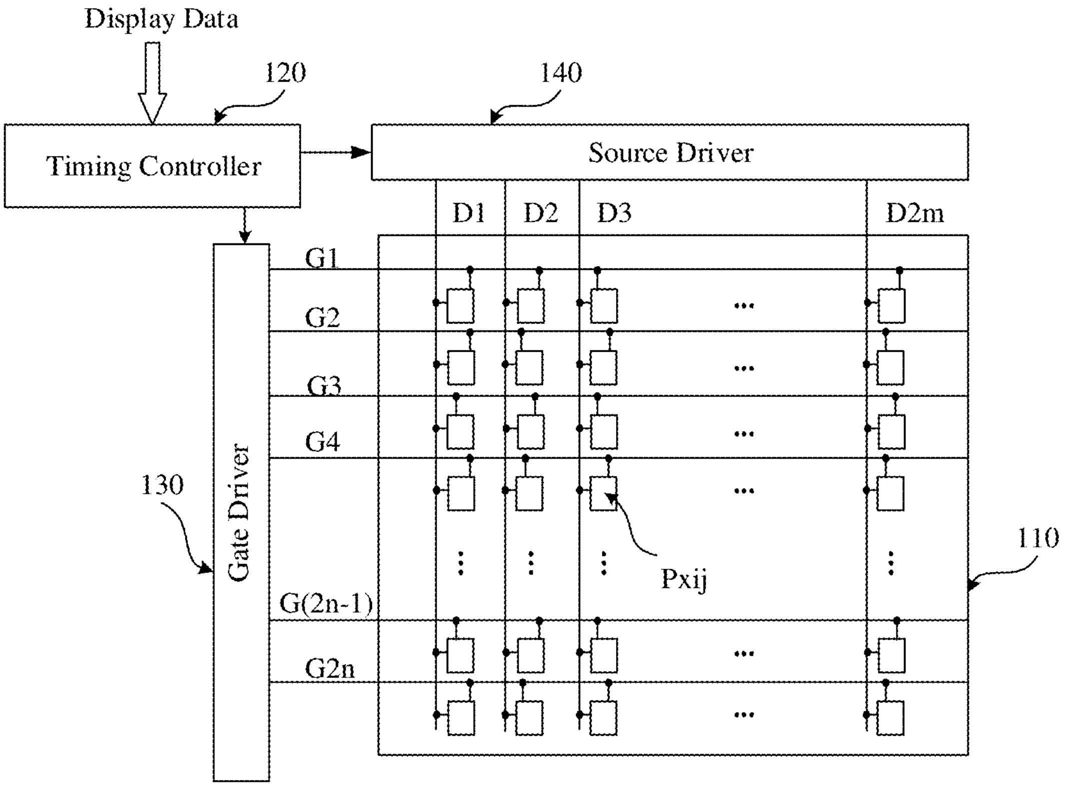
FIG. 1 shows a schematic diagram of a display system.

Unless otherwise defined, all the technical and scientific terms used herein have the same meanings as commonly understood by one of ordinary skill in the art to which the present disclosure belongs. The terms, such as 'first,' 'second,' or the like, which are used in the present disclosure, are not intended to indicate any sequence, amount or importance, but for distinguishing various components. Likewise, words, such as 'a', 'an', or 'the' do not indicate a quantity limit, but rather, it may indicate at least one. The terms, such as 'comprise/comprising,' 'include/including,' or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, 'on,' 'under,' 'left,' 'right,' or the like are only used to indicate relative position relationship, and when the absolute position of the object which is described is changed, the relative position relationship may be changed accordingly FIG. 1 shows a schematic diagram of a display system. As shown in FIG. 1, the display system generally includes a display panel 110, a timing controller 120, a gate driver 130, and a source driver 140.

The display panel 110 generally includes gate scanning signal lines (G1-G2*n*), data signal lines (D1-D2*m*) and pixels. The gate scanning signal lines are used to transmit driving signals for turning on pixel switch devices, which are row signals. The data signal lines send data signals for adjusting the gray scale of pixel display, which are column signals. The pixels are the smallest complete display units of the display panel. Each pixel is generally composed of a number of sub-pixels Pxij, and the sub-pixels Pxij are generally arranged along the gate scanning signal lines. The display panel 110 has a physical resolution of 2m*2n, meaning that there are 2m pixels in each row (referred to as horizontal resolution) and there are 2n pixels in each column (referred to as vertical resolution), each pixel includes a plurality of sub-pixels, such as red sub-pixels, green sub-pixels, and blue sub-pixels.

The timing controller 120 refers to a board card for realizing a timing conversion function, and sends a clock signal to the gate driver 130 and sends the received display signal data to the source driver chip. The received pixel data is in one-to-one correspondence to the sent pixel data, which is commonly known as Point to Point (P to P)

The gate driver 130 is used to generate a gate driving signal according to the clock signal and send the gate driving signal to multiple rows of sub-pixels through the gate scanning signal lines in a time division manner. For example, the gate driving signal may be sent to multiple rows of sub-pixels row by row, so that the multiple rows of sub-pixels are turned on row by row.

The source driver 140 is responsible for converting the received digital data signal into an analog data signal that can drive multiple columns of sub-pixels to display, and its output channels are in one-to-one correspondence to the data signal lines of the display panel.

In order to reduce the cost and decrease the quantity of source drivers used, the display panel can adopt a dual-gate pixel architecture, which is mainly characterized by doubling the quantity of gate scanning signal lines and halving the quantity of data signal lines. In other words, for one row of pixels, upper and lower gate scanning signal lines are required to be driven in a time division manner, and the data signal lines are required to send data signals twice.

Figure 2:
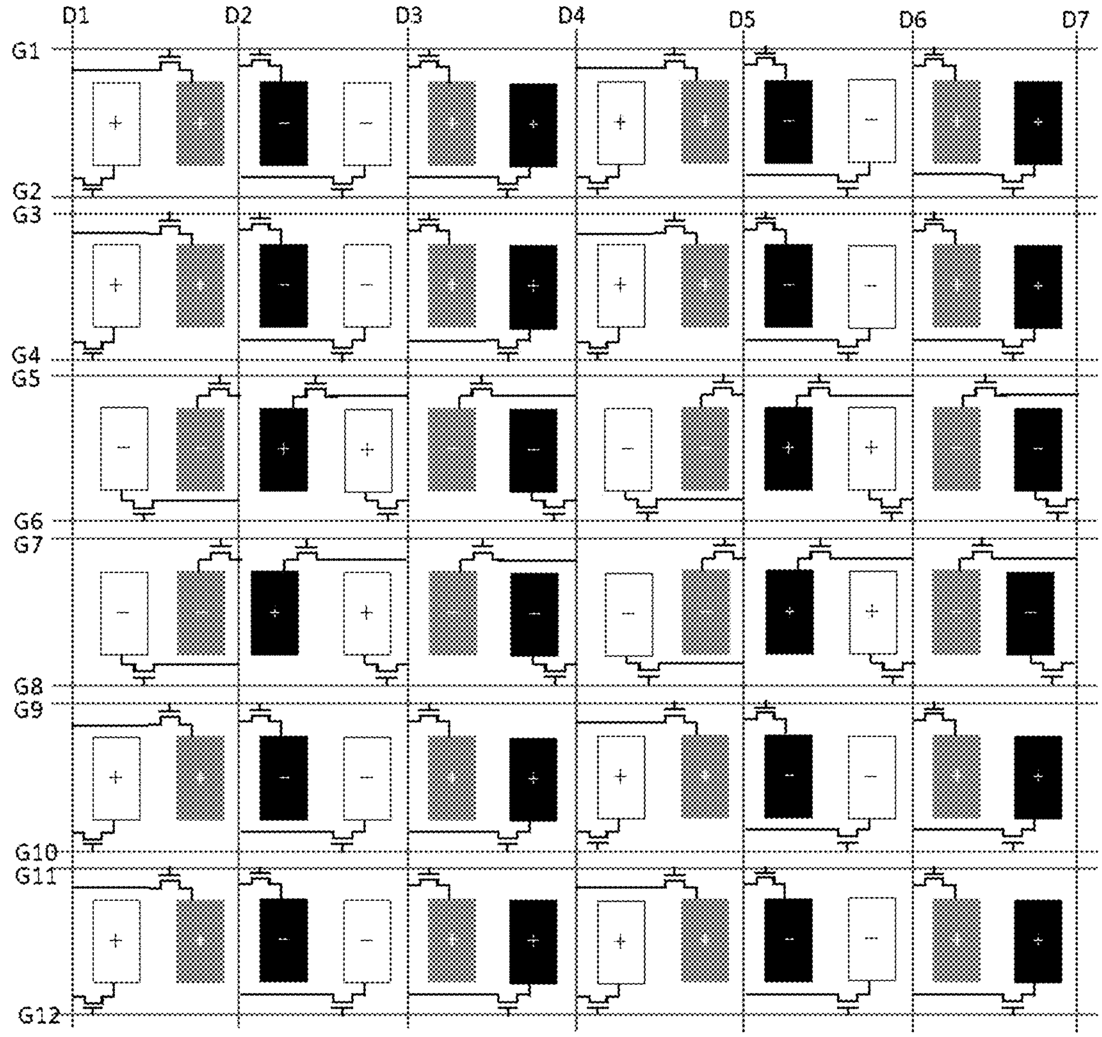
FIG. 2 shows a schematic diagram of a dual-gate pixel architecture.

FIG. 2 shows a schematic diagram of a dual-gate pixel architecture.

As shown in FIG. 2, each row of sub-pixels connect upper and lower gate scanning signal lines, and each data signal line connects two columns of sub-pixels. The connections between sub-pixels and data signal lines include short connections and long connections (the connection between a sub-pixel and an adjacent data signal line is a short connection, while the connection between a sub-pixel and a non-adjacent data signal line is a long connection). Two sub-pixels located between two adjacent data signal lines and between two adjacent gate scanning signal lines are connected to a same data signal line. For example, two sub-pixels located between data signal lines D1 and D2 and between gate scanning signal lines G1 and G2 are connected to the data signal line G1. Two sub-pixels located between two adjacent data signal lines and between two adjacent gate scanning signal lines are connected to different gate scanning signal lines, and the connection rule for the data signal lines and the sub-pixels in the horizontal direction is in such a cycle: long connection on the upper side and short connection on the lower side, short connection on the upper side and long connection on the lower side, and short connection on the upper side and long connection on the lower side; or, short connection on the upper side and long connection on the lower side, long connection on the upper side and short connection on the lower side, and long connection on the upper side and short connection on the lower side. The connection mode for the data signal lines and the sub-pixels in the vertical direction has a cycle of two rows and one jump. For example, the first and second rows of sub-pixels and the third and fourth rows of sub-pixels are located on two sides of the same data signal line, respectively, the first and second rows of sub-pixels are connected from the first data signal line, and the third and fourth rows of sub-pixels are connected from the second data signal line.

Figure 3:
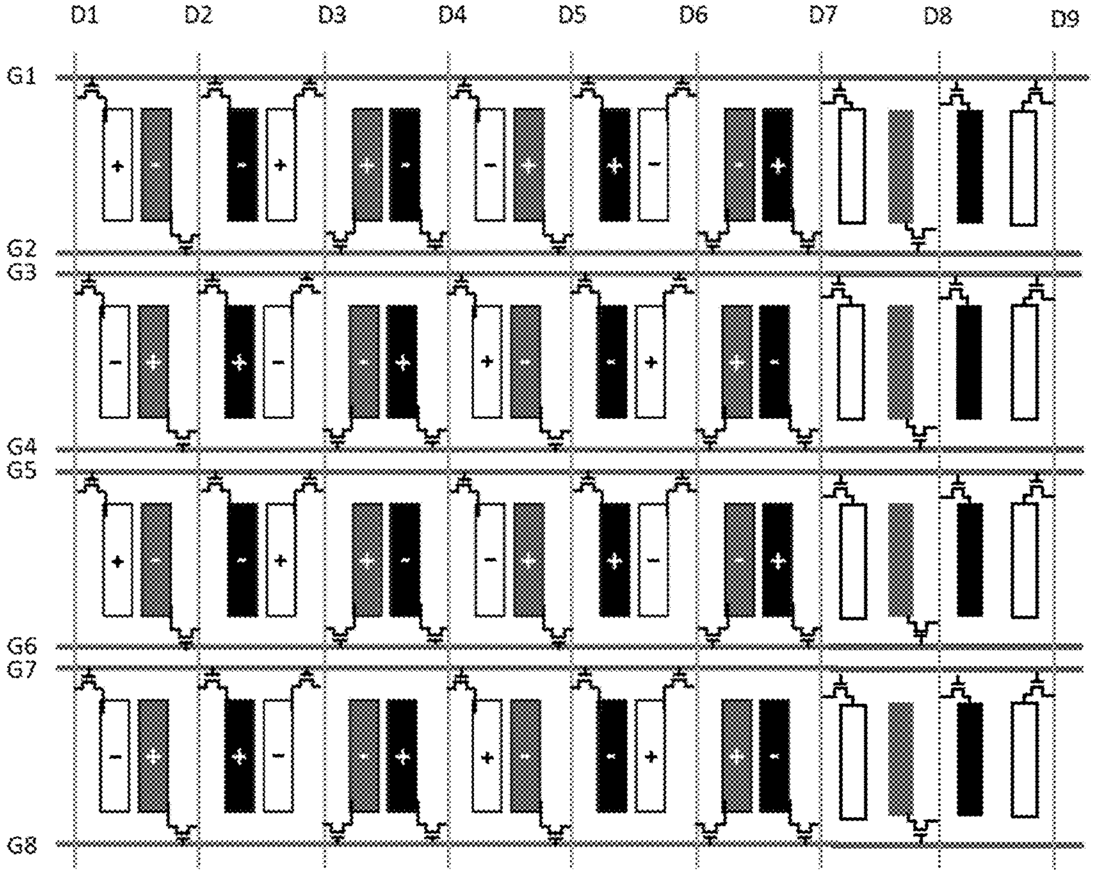
FIG. 3 shows a schematic diagram of another dual-gate pixel architecture.

FIG. 3 shows a schematic diagram of another dual-gate pixel architecture.

As shown in FIG. 3, each row of sub-pixels connect upper and lower gate scanning signal lines, and each data signal line connects two columns of sub-pixels. The connections between sub-pixels and data signal lines are all short connections. Two sub-pixel units between two adjacent data signal lines and two adjacent gate scanning signal lines are connected to two data signal lines, respectively, but may be connected to one gate scanning signal line or different gate scanning signal lines. The rule in the horizontal direction is UPPER LOWER, UPPER UPPER, and LOWER LOWER, and the rule in the vertical direction is the same.

In FIG. 2 and FIG. 3, boxes with different gray scales represent sub-pixels of different colors. For example, white boxes represent red sub-pixels, gray boxes represent green sub-pixels, and black boxes represent blue sub-pixels.

In the above two architectures, for the same column of data signal lines, the sub-pixels connected by two adjacent rows of gate scanning signal lines are not in the same color.

Another feature of the two architectures is as follows: in the scanning direction of the gate driving signal from top to bottom and the data driving signal from left to right, i.e., starting from the upper left corner shown, three adjacent sub-pixels of each color in the horizontal direction are used as one group, three sub-pixels in one group of sub-pixel are hung on the upper gate scanning signal line; three sub-pixels in one group of sub-pixels are hung on the lower gate scanning signal line; and the first and third pixels in another group of sub-pixels are hung on the upper gate scanning signal lines, while the second sub-pixel is hung on the lower gate scanning signal line. Thus, a structure of UPPER UPPER UPPER, LOWER LOWER LOWER and UPPER LOWER UPPER is formed. For example, as the structure shown in FIG. 2, for the first row, starting from the leftmost side, three adjacent red sub-pixels (represented by white boxes) are connected to the lower gate scanning signal line (i.e., G2); three adjacent green sub-pixels (represented by gray boxes) are connected to the upper gate scanning signal line (i.e., G1); and the first and third sub-pixels among three adjacent blue sub-pixels (represented by black boxes) are connected to the upper gate scanning signal line (i.e., G1), and the second sub-pixel is connected to the lower gate scanning signal line (i.e., G2).

Figure 4:
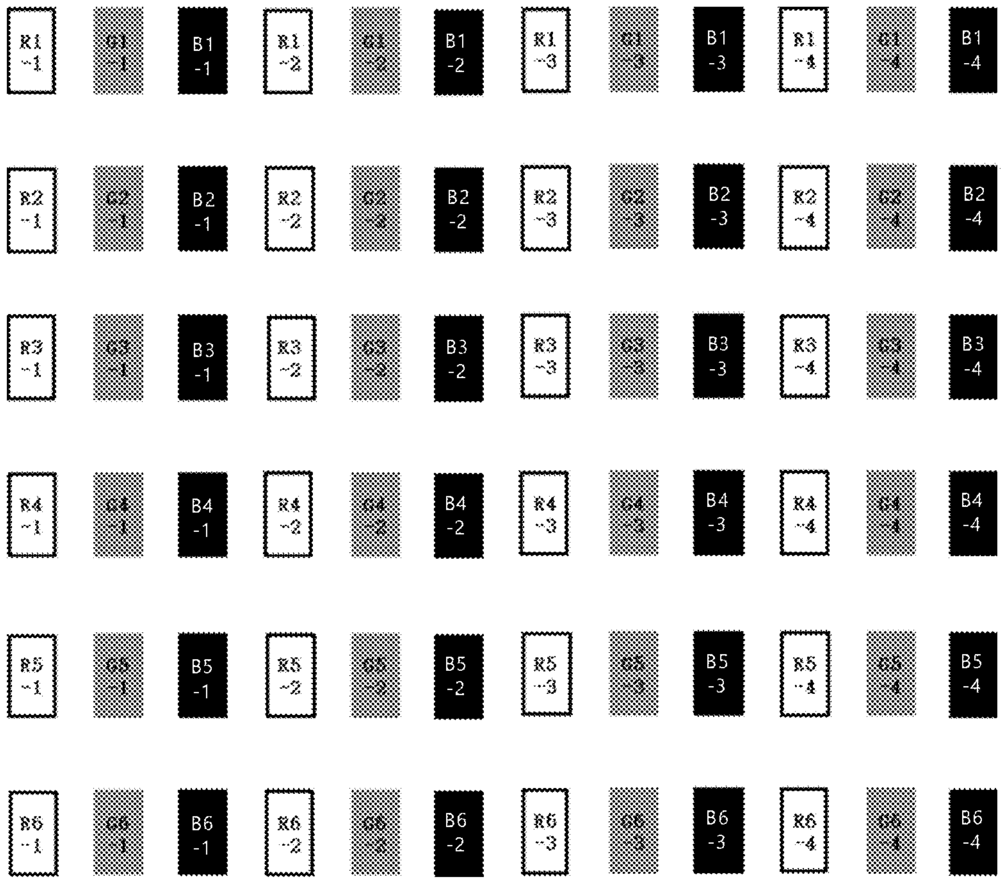
FIG. 4 shows a schematic diagram of pixel data.

FIG. 4 shows a schematic diagram of pixel data.

As shown in FIG. 2 and FIG. 4, for the dual-gate architecture shown in FIG. 2:

R1-1 corresponds to sub-pixel G2D1 (G2D1 represents the sub-pixel connected to the gate scanning signal line G2 and the data signal line D1, similarly hereinafter), that is, R1-1 is the data of sub-pixel G2D1; G1-1 corresponds to sub-pixel G1D1, B1-1 corresponds to sub-pixel G1D2, R1-2 corresponds to sub-pixel G2D2, G1-2 corresponds to sub-pixel G1D3, and B1-2 corresponds to sub-pixel G2D3;

R2-1 corresponds to sub-pixel G4D1, G2-1 corresponds to sub-pixel G3D1, B2-1 corresponds to sub-pixel G3D2, R2-2 corresponds to sub-pixel G4D2, G2-2 corresponds to sub-pixel G3D3, and B2-2 corresponds to sub-pixel G4D3;

R3-1 corresponds to sub-pixel G6D2, G3-1 corresponds to sub-pixel G5D2, B3-1 corresponds to sub-pixel G5D3, R3-2 corresponds to sub-pixel G6D3, G3-2 corresponds to sub-pixel G5D4, and B3-2 corresponds to sub-pixel G6D4;

R4-1 corresponds to sub-pixel G8D2, G4-1 corresponds to sub-pixel G7D2, B4-1 corresponds to sub-pixel G7D3, R4-2 corresponds to sub-pixel G8D3, G4-2 corresponds to sub-pixel G7D4, and B4-2 corresponds to sub-pixel G8D4;

4 rows form one cycle, and so on.

As shown in FIG. 3 and FIG. 4, for the dual-gate architecture shown in FIG. 3:

R1-1 corresponds to sub-pixel G1D1, G1-1 corresponds to sub-pixel G2D2, B1-1 corresponds to sub-pixel G1D2, R1-2 corresponds to sub-pixel G1D3, G1-2 corresponds to sub-pixel G2D3, and B1-2 corresponds to sub-pixel G2D4;

R2-1 corresponds to sub-pixel G3D1, G2-1 corresponds to sub-pixel G4D2, B2-1 corresponds to sub-pixel G3D2, R2-2 corresponds to sub-pixel G3D3, G2-2 corresponds to sub-pixel G4D3, and B2-2 corresponds to sub-pixel G4D4; and so on.

Figure 5:
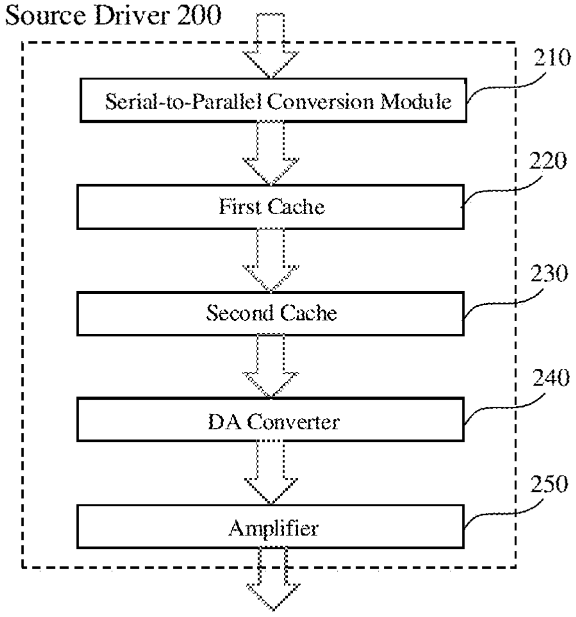
FIG. 5 shows a schematic diagram of a source driver

FIG. 5 shows a schematic diagram of a source driver.

As shown in FIG. 5, the source driver 200 includes a serial-to-parallel conversion module 210, a first cache 220, a second cache 230, a digital-to-analog (DA) converter 240, and an amplifier 250.

The serial-to-parallel conversion module 210 receives serial digital data driving signals sent by the front end, i.e., sequentially receiving the digital data driving signal from each sub-pixel, then converts the serial digital data driving signals into parallel digital data driving signals, and stores the parallel digital data driving signals into the first cache 220. Then, the first cache 220 sends the digital data driving signals to the second cache 230. The second cache 230 is connected to the digital-to-analog converter 240, the digital data driving signals are converted into analog data driving signals by the digital-to-analog converter 240, and the analog data driving signals are sent to the display panel by the amplifier 250. After the digital data driving signals are sent to the second cache 230, the serial-to-parallel conversion module 210 starts to receive the data of a next row. That is, the second cache 230 stores the data of the currently displayed row, while the first cache 220 stores the data of the next row to be displayed. Thus, two caches are needed.

In the dual-gate pixel architecture, each row of sub-pixels is driven by two gate driving signals in a time division manner, and the data signal corresponding to each row of sub-pixels is sent twice. For example, the first row of sub-pixels is connected to the first gate scanning signal line and the second gate scanning line. During the first gate scanning signal line outputs a gate driving signal, a plurality of sub-pixels in the first row connected to the first gate scanning signal line are turned on, and the display data can be output to these sub-pixels through a plurality of data signal lines during this period. During the second gate scanning signal line outputs a gate driving signal, a plurality of sub-pixels in the first row connected to the second gate scanning signal line are turned on, and the display data can be output to these sub-pixels through a plurality of data signal lines during this period.

Figure 6A:
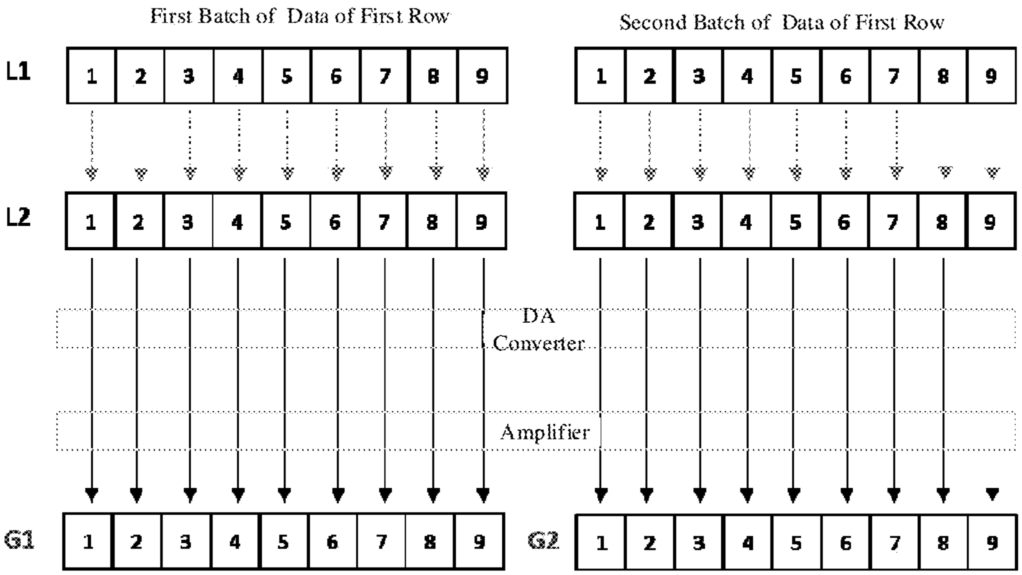
FIG. 6A shows a schematic diagram of transmission of data corresponding to the first row of sub-pixels of the pixel architecture shown in FIG. 2 in the source driver.
Figure 6B:
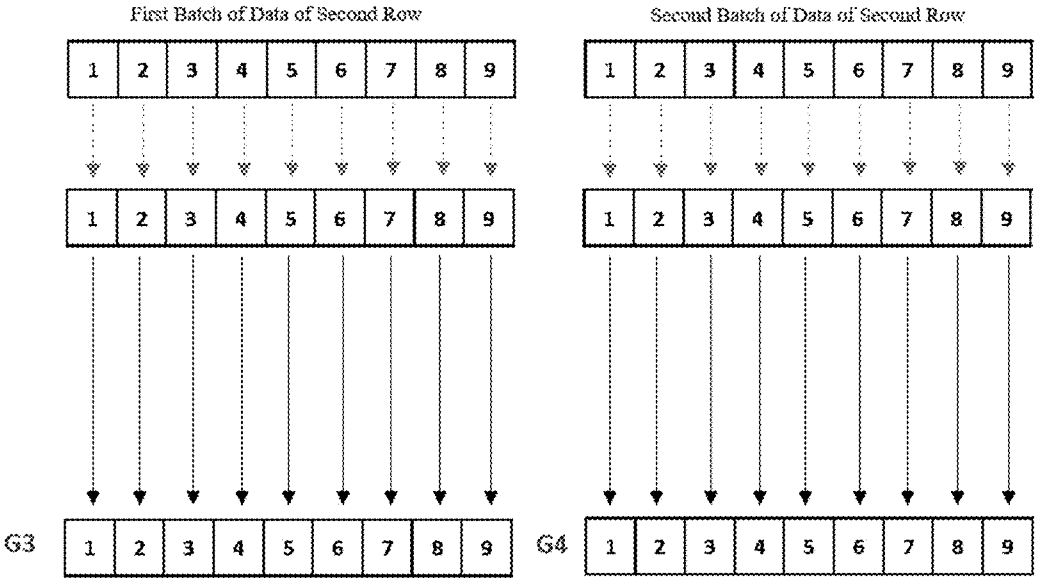
FIG. 6B shows a schematic diagram of transmission of data corresponding to the second row of sub-pixels of the pixel architecture shown in FIG. 2 in the source driver.
Figure 6C:
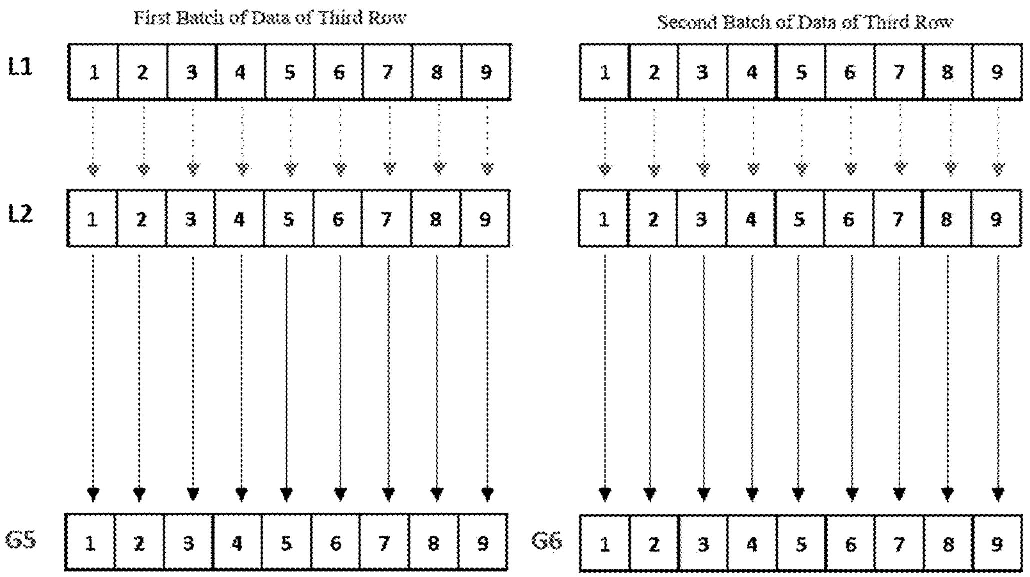
FIG. 6C shows a schematic diagram of transmission of data corresponding to the third row of sub-pixels of the pixel architecture shown in FIG. 2 in the source driver.
Figure 6D:
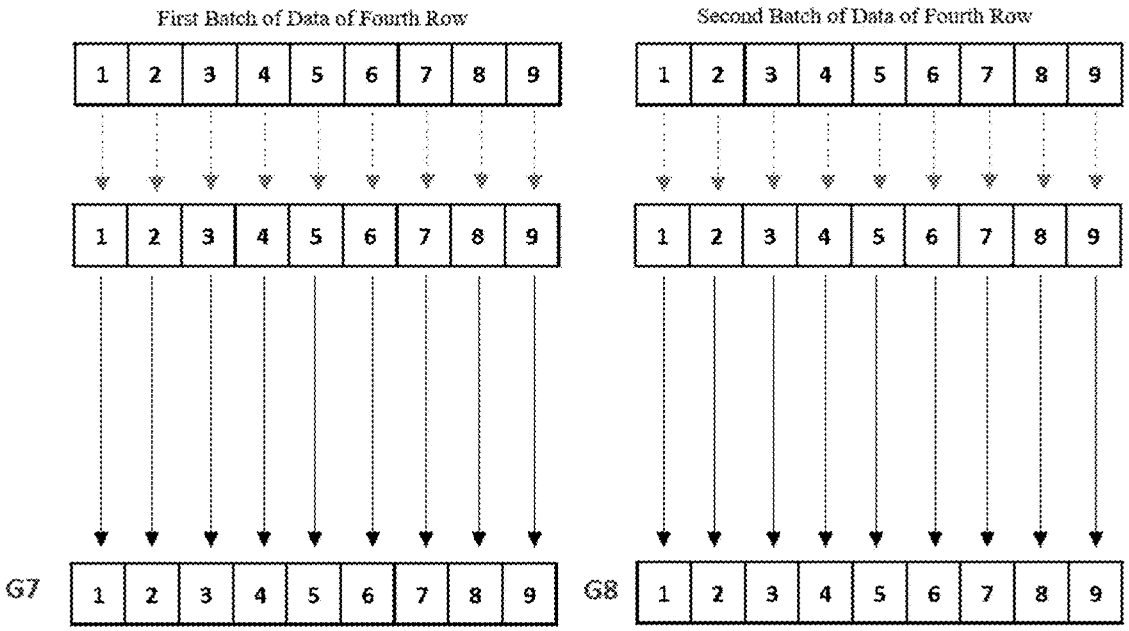
FIG. 6D shows a schematic diagram of transmission of data corresponding to the fourth row of sub-pixels of the pixel architecture shown in FIG. 2 in the source driver.

FIG. 6A shows a schematic diagram of transmission of data corresponding to the first row of sub-pixels of the pixel architecture shown in FIG. 2 in the source driver. FIG. 6B shows a schematic diagram of transmission of data corresponding to the second row of sub-pixels of the pixel architecture shown in FIG. 2 in the source driver. FIG. 6C shows a schematic diagram of transmission of data corresponding to the third row of sub-pixels of the pixel architecture shown in FIG. 2 in the source driver. FIG. 6D shows a schematic diagram of transmission of data corresponding to the fourth row of sub-pixels of the pixel architecture shown in FIG. 2 in the source driver.

As shown in FIGS. 6A-6D, L1/L2 represents the first cache and the second cache, respectively, and G1-G8 represent the first to eighth rows of gate scanning signal lines, respectively.

Channels 1-9 in L1/L2/G1 correspond to sub-pixels G1D1-G1D9 in FIG. 2, respectively, i.e., G1-1/B1-1/G1-2/G1-3/B1-3/G1-4/G1-5/B1-5/G1-6.

Channels 1-9 in L1/L2/G2 correspond to sub-pixels G2D1-G2D9 in FIG. 2, respectively, i.e., R1-1/R1-2/B1-2/R1-3/R1-4/B1-4/R1-5/R1-6/B1-6.

Channels 1-9 in L1/L2/G3 correspond to sub-pixels G3D1-G3D9 in FIG. 2, respectively, i.e., G2-1/B2-1/G2-2/G2-3/B2-3/G2-4/G2-5/B2-5/G2-6.

Channels 1-9 in L1/L2/G4 correspond to sub-pixels G4D1-G4D9 in FIG. 2, respectively, i.e., R2-1/R2-2/B2-2/R2-3/R2-4/B2-4/R2-5/R2-6/B2-6.

Channels 1-9 in L1/L2/G5 correspond to sub-pixels G5D1-G5D9 in FIG. 2, respectively, where G5D2-G5D9 correspond to G3-1/B3-1/G3-2/G3-3/B3-3/G3-4/G3-5/B3-5, but G5D1 corresponds to no any pixel unit, that is, the data sent by the front end is invalid.

Channels 1-9 in L1/L2/G6 correspond to sub-pixels G6D1-G6D9 in FIG. 2, respectively, where G6D2-G6D9 correspond to R3-1/R3-2/B3-2/R3-3/R3-4/B3-4/R3-5/R3-6, but G6D1 corresponds to no any pixel unit, that is, the data sent by the front end is invalid.

Channels 1-9 in L1/L2/G7 correspond to sub-pixels G7D1-G7D9 in FIG. 2, respectively, where G7D2-G7D9 correspond to G4-1/B4-1/G4-2/G4-3/B4-3/G4-4/G4-5/B4-5, but G7D1 corresponds to no any pixel unit, that is, the data sent by the front end is invalid.

Channels 1-9 in L1/L2/G8 correspond to sub-pixels G8D1-G8D9 in FIG. 2, respectively, where G7D2-G6D9 correspond to R4-1/R4-2/B4-2/R4-3/R4-4/B4-4/R4-5/R4-6, but G8D1 corresponds to no any pixel unit, that is, the data sent by the front end is invalid.

It is to be noted that a piece of virtual data will be compensated for sub-pixels G5D1/G6D1/G7D1/G8D1 because the amount of data sent in each row is the same.

And so on.

Figure 7:
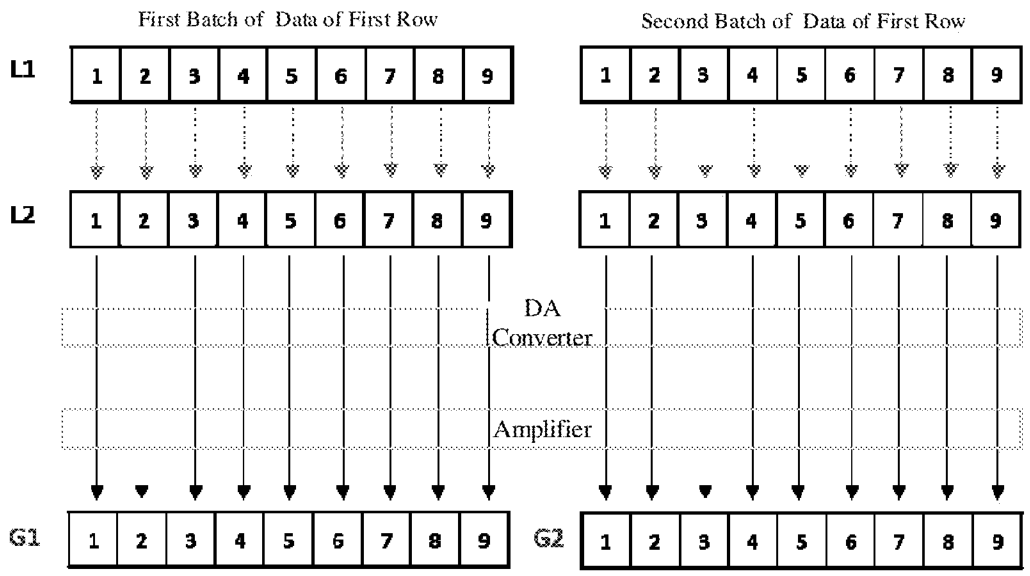
FIG. 7 shows a schematic diagram of transmission of data corresponding to the first row of sub-pixels of the pixel architecture shown in FIG. 3 in the source driver.

FIG. 7 shows a schematic diagram of transmission of data corresponding to the first row of sub-pixels of the pixel architecture shown in FIG. 3 in the source driver.

As shown in FIG. 7, channels 1-9 in L1/L2/G1 correspond to sub-pixels G1D1-G1D9 in FIG. 3, respectively, i.e., R1-1/B1-1/R1-2/R1-3/B1-3/R1-4/R1-5/B1-5/R1-6.

Channels 1-9 in L1/L2/G2 correspond to sub-pixels G2D1-G2D9 in FIG. 3, respectively, i.e., G1-1/G1-2/B1-2/G1-3/G1-4/B1-4/G1-5/G1-6/B1-6.

And so on.

The resolution of a display signal is required to match the physical resolution of the display panel, that is, the data is in one-to-one correspondence to physical sub-pixels. When the resolution of a display signal does not match the physical resolution of the display panel, for example, if the horizontal resolution of the display signal is only half of the resolution of the display panel, the display panel cannot display this display signal. When the resolution of a display signal is less than the physical resolution of the display panel, this display signal may be expanded, for example, in the horizontal direction, so that the horizontal resolution of the expanded display signal is consistent with the horizontal resolution of the display panel.

The existing horizontal resolution expansion schemes cannot realize the expansion of the horizontal resolution of the dual-gate pixel architecture, so how to realize the horizontal resolution expansion function of the dual-gate pixel architecture is a problem to be solved.

At least one embodiment of the present disclosure provides a display apparatus, a control method, an electronic device, and a computer-readable storage medium. This display apparatus includes a display substrate and a source driver. The display substrate includes multiple rows and columns of sub-pixels arranged in array, a plurality of gate scanning signal lines, and a plurality of data signal lines. The source driver includes a first cache module, a second cache module, an operation conversion module, and an output module, the first cache module includes M first cache units, which can cache N pieces of initial data at intervals, where each piece of the initial data corresponds to one of the data signal lines; the second cache module includes M second cache units in one-to-one correspondence to the M first cache units; the operation conversion module is connected between the first cache module and the second cache module, and is configured to: send P pieces of initial data among the N pieces of initial data to P corresponding second cache units according to a control signal, calculate (M-P) pieces of interpolation data based on Q pieces of initial data among the N pieces of initial data, and send the (M-P) pieces of interpolation data to (M-P) second cache units other than the P second cache units; and the output module is configured to output M pieces of data cached by the M second cache units to the plurality of data signal lines, where M is a positive integer greater than 2, N is a positive integer less than M, and both P and Q are positive integers less than or equal to N.

In accordance with this display apparatus, by storing each batch of N pieces of initial data of the dual-gate pixel architecture into the first cache module at intervals and controlling the data transmission and the interpolation operation between the first cache module and the second cache module by the operation conversion module, the expansion of the horizontal resolution of each batch of N pieces of initial data is realized. In this way, based on at least one embodiment of the present disclosure, the expansion of the horizontal resolution of at least part of the dual-gate pixel architecture is realized.

Figure 8:
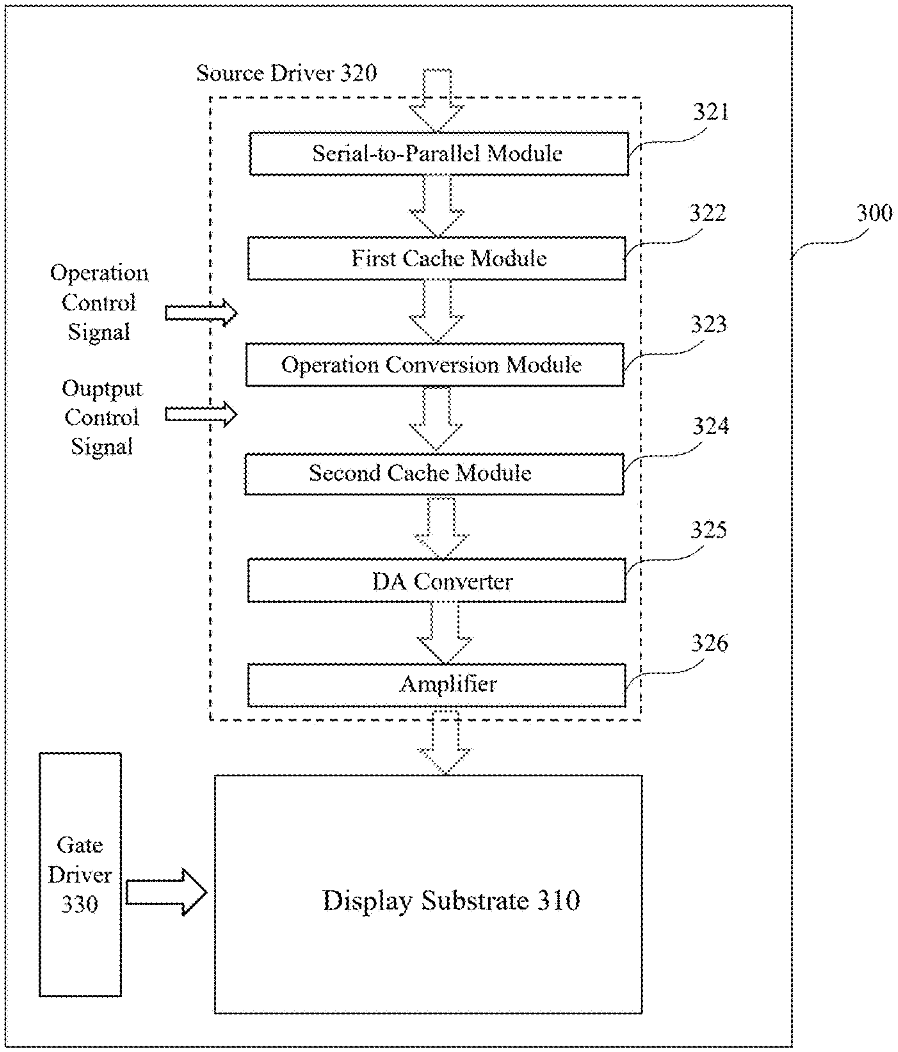
FIG. 8 shows a schematic diagram of a display apparatus according to at least one embodiment of the present disclosure.

FIG. 8 shows a schematic diagram of a display apparatus according to at least one embodiment of the present disclosure.

As shown in FIG. 8, the display apparatus 300 includes a display substrate 310 and a source driver 320. The display substrate 310 includes multiple rows and columns of sub-pixels arranged in array, a plurality of gate scanning signal lines, and a plurality of data signal lines. The source driver 320 includes a first cache module 322, a second cache module 324, an operation conversion module 323, and an output module. The first cache module 322 includes M first cache units, which can cache N pieces of initial data at intervals. The second cache module 324 includes M second cache units in one-to-one correspondence to the M first cache units. The operation conversion module 323 is connected between the first cache module and the second cache module, and is configured to: send P pieces of initial data among the N pieces of initial data to P corresponding second cache units according to a control signal, calculate (M-P) pieces of interpolation data based on Q pieces of initial data among the N pieces of initial data, and send the (M-P) pieces of interpolation data to (M-P) second cache units other than the P second cache units. The output module is configured to output M pieces of data cached by the M second cache units to the plurality of data signal lines. M is a positive integer greater than 2, N is a positive integer less than M, and both P and Q are positive integers less than or equal to N.

For example, the display substrate 310 can adopt a dual-gate pixel architecture. As shown in FIG. 2 or FIG. 3, for example, each row of the multiple rows and columns of sub-pixels includes sub-pixels of multiple colors, and the sub-pixels of multiple colors are cyclically arranged. Every two gate scanning signal lines among the plurality of gate scanning signal lines connect one row of sub-pixels, and each of the plurality of data signal lines connects two columns of sub-pixels. Two sub-pixels connected to a same data signal line and connected to two adjacent gate scanning signal lines respectively are sub-pixels of different colors.

For example, the display apparatus 300 may further include a gate driver 330 used to sequentially shift and output gate scanning signals to the plurality of gate scanning signal lines. In addition, the display apparatus 300 may further include other devices, such as a timing controller. The source driver 320 may further include other modules, such as a serial-to-parallel conversion module 321.

For example, the output module includes a digital-to-analog converter 325 and an amplifier 326. The digital-to-analog converter 325 is configured to convert signals corresponding to the M pieces of data into analog driving signals, and the amplifier 326 is configured to amplify the analog driving signals and then output them to the plurality of data signal lines.

For example, the quantity of the data signal lines included in the display substrate 310 may be M. The M data signal lines correspond to M channels of the source driver, respectively; the M first cache units correspond to the M channels, respectively; and the M second cache units also correspond to the M channels, respectively.

For example, each first cache unit may be used to cache one piece of initial data, and the N pieces of initial data are stored in the M first cache units at intervals. Each cache unit corresponds to one channel and each channel corresponds to one data signal line, so each piece of initial data may correspond to one data signal line and one piece of initial data may be output to one sub-pixel.

For example, unlike the source driver 200 shown in FIG. 5, in the source driver 300 in the embodiment of the present disclosure, an operation converter 232 is additionally provided between the first cache module 322 and the second cache module 324, and the way to store data by the first cache module 322 is also different. The operation converter 323 may include a plurality of operation units. The operation units may perform a copy operation or an averaging operation (arithmetic units with other operation modes are also possible, and the following description will be given by using the averaging operation as an example). The operation converter 323 may send at least part of data stored in the first cache module 322 to the second cache module 324, and may also send the results of operation of the operation units to the second cache module. The operation converter may receive an operation control signal, which is used to control whether to output the data of each first cache unit in the first cache module 322 and output it to the second cache module 324 or the operation unit, or not. The operation converter may also receive an output control signal, which is used to control whether to output the result of operation of each operation unit in the operation converter to the second cache unit and output it to which second cache unit? How the source driver in the embodiment of the present disclosure realizes the expansion of the horizontal resolution of the display signal of the dual-gate pixel architecture will be described below by specific embodiments.

For example, the multiple rows and columns of sub-pixels include the $i^{th}$ row of sub-pixels, and the source driver further includes a data module configured to: obtain a first group of initial data and a second group of initial data determined based on multiple pieces of initial data corresponding to the $i^{th}$ row of sub-pixels, the first group of initial data corresponding to a first part of sub-pixels in the $i^{th}$ row of sub-pixels, the second group of initial data corresponding to a second part of sub-pixels in the $i^{th}$ row of sub-pixels, the first part of sub-pixels includes sub-pixels of a first color and sub-pixels of a second color, the second part of sub-pixels includes sub-pixels of the second color and sub-pixels of a third color, and each of the first group of initial data and the second group of initial data includes the N pieces of initial data; output the first group of initial data to the first cache module at a first moment, so that the first cache module caches the first group of initial data; and output the second group of initial data to the first cache module at a second moment, so that the first cache module caches the second group of initial data, where i is a positive integer.

For example, repetitive data may be presented between the first group of initial data and the second group of initial data. For example, in some embodiments, the sub-pixels of the first color may be green sub-pixels, the sub-pixels of the second color may be blue sub-pixels, the sub-pixels of the third color may be red sub-pixels, and the initial data corresponding to the blue sub-pixels repeatedly occurs in the first group of initial data and the second group of initial data. In other embodiments, the repetitive part in the first group of initial data and the second group of initial data may also be initial data corresponding to the sub-pixels of other colors, for example, the initial data corresponding to the red sub-pixels or the initial data corresponding to the green sub-pixels. In other embodiments, the display substrate may further include sub-pixels of other colors, such as white sub-pixels.

For example, the timing controller may obtain the first group of initial data and the second group of initial data based on multiple pieces of initial data corresponding to the $i^{th}$ row of sub-pixels and then send the first group of initial data and the second group of initial data to the source driver; or the timing controller may send multiple pieces of initial data corresponding to the $i^{th}$ row of sub-pixels to the source driver, and the source driver obtains the first group of initial data and the second group of initial data based on the multiple pieces of initial data corresponding to the $i^{th}$ row of sub-pixels.

For example, every two pieces of initial data among the N pieces of initial data are stored as a subgroup in two adjacent first cache units, and one first cache unit is spaced between every two subgroups. In other embodiments, every three or more pieces of initial data may be stored as a subgroup in three or more adjacent first cache units, and each subgroup may be spaced by two or more first cache units. The specific arrangement may be set according to actual requirements.

For example, the source driver may further include a controller, and the controller may be connected to the operation conversion module and may be configured to: in the process of processing the first group of initial data, control the operation conversion module to output two pieces of initial data in each subgroup to two corresponding second cache units; and control the operation conversion module to calculate a piece of interpolation data based on the first piece of data in every two adjacent subgroups to obtain multiple pieces of interpolation data and output the multiple pieces of interpolation data to other second cache units.

For example, the controller is further configured to: in the process of processing the second group of initial data, control the operation conversion module to output the first piece of initial data in each subgroup to one corresponding second cache unit; calculate a piece of interpolation data based on the first piece of initial data in every two adjacent subgroups and output this piece of interpolation data to one second cache unit; and, calculate a piece of interpolation data based on the second piece of initial data in every two adjacent subgroups and output this piece of interpolation data to one second cache unit.

Figure 9A:
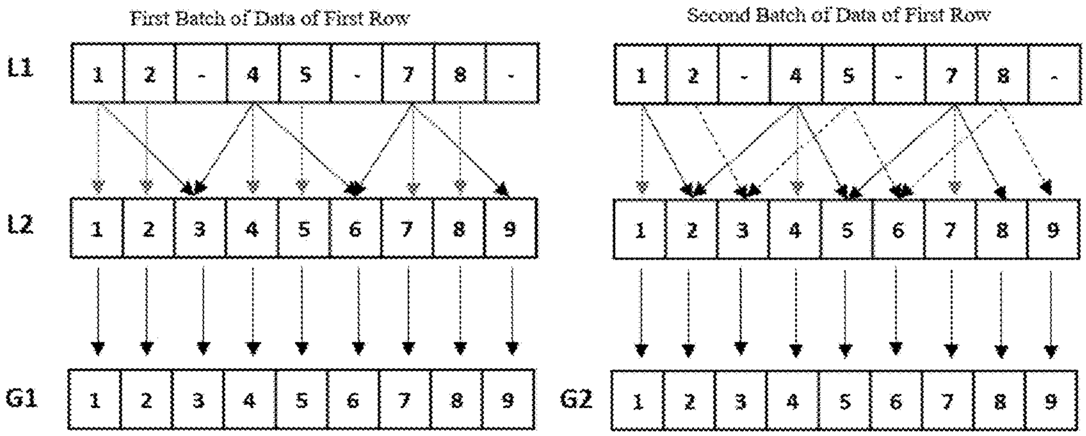
FIG. 9A shows a schematic diagram of transmission of data corresponding to the first row of sub-pixels of the pixel architecture shown in FIG. 2 in the source driver according to at least one embodiment of the present disclosure.

FIG. 9A shows a schematic diagram of transmission of data corresponding to the first row of sub-pixels of the pixel architecture shown in FIG. 2 in the source driver according to at least one embodiment of the present disclosure.

As shown in FIG. 9A, the first batch of data of the first row may be the first group of initial data corresponding to the first row of sub-pixels, and the second batch of data of the first row may be the second group of initial data corresponding to the first row of sub-pixels.

For example, the first batch of data of the first row may include sub-pixel data G1-1/B1-1/G1-2/B1-2/G1-3/B1-3/G1-4/B1-4, etc., shown in FIG. 4, and these data is sequentially stored into channels 1/2/4/5/7/8/10/11 of the first cache module; and so on. The data of each channel of the first cache module is stored into the corresponding channel of the second cache module. The data of channel 1 and the data of channel 4 of the first cache module are averaged to generate G1-1', which is stored into channel 3 of the second cache module; the data of channel 4 and the data of channel 7 of the first cache module are averaged to generate G1-2', which is stored into channel 6 of the second cache module; the data of channel 7 and the data of channel 10 of the first cache module are averaged to generate G1-3', which is stored into channel 9 of the second cache module; and so on. For example, the data, i.e., G1-1/B1-1/G1-1'/G1-2/B1-2/G1-2'/G1-3/B1-3/G1-3', etc., stored by each channel of the second cache module is sent to the corresponding data signal line of the display panel through the digital-to-analog converter and the amplifier.

By storing the first batch of data of the first row into the first cache module at intervals and controlling data transmission and interpolation operation by the operation conversion module, the expansion of the horizontal resolution of the first batch of data of the first row is realized, and the color arrangement of the group of data obtained by expansion (i.e., the data cached in the second cache module) is consistent with the color arrangement of a plurality of sub-pixels connected by the first gate scanning signal line G1, so that the expanded data can be transmitted to the plurality of sub-pixels connected by the first gate scanning signal line G1.

For example, the second batch of data of the first row may include sub-pixel data R1-1/B1-1/R1-2/B1-2/R1-3/B1-3/R1-4/B1-4 or the like shown in FIG. 4, and the data is sequentially stored into channels 1/2/4/5/7/8/10/11 of the first cache module; and so on. The data of channels 1/4/7/10 of the first cache module is stored into the corresponding channels of the second cache module. The data of channel 1 and the data of channel 4 of the first cache module are averaged to generate R1-1', which is stored into channel 2 of the second cache module; the data of channel 4 and the data of channel 7 of the first cache module are averaged to generate R1-2', which is stored into channel 5 of the second cache module; the data of channel 7 and the data of channel 10 of the first cache module are averaged to generate R1-3', which is stored into channel 8 of the second cache module; and so on.

For example, the data of channels 2/5/8/11 of the first cache module is not sent to the corresponding channels of the second cache module. However, the data of channel 2 and the data of channel 5 of the first cache module are averaged to generate B1-1', which is stored into channel 3 of the second cache module; the data of channel 5 and the data of channel 8 of the first cache module are averaged to generate B1-2', which is stored into channel 6 of the second cache module; the data of channel 8 and the data of channel 11 of the first cache module are averaged to generate B1-3', which is stored into channel 9 of the second cache module; and so on.

For example, the data, i.e., R1-1/R1-1'/B1-1'/R1-2/R1-2'/B1-2'/R1-3/R1-3'/B1-3', etc., stored by each channel of the second cache module is sent to the corresponding data signal line of the display panel through the digital-to-analog converter and the amplifier.

For example, if the averaging operation cannot be performed in the process of processing the last column of pixel data (including three columns of R/G/B sub-pixels), one more column of pixel data may be sent. This column of data may be the first column of the next source driver, or may be a copy of this column of data.

By storing the second batch of data of the first row into the first cache module at intervals and controlling data transmission and interpolation operation by the operation conversion module, the expansion of the horizontal resolution of the second batch of data of the first row is realized, and the color arrangement of the group of data obtained by expansion (i.e., the data cached in the second cache module) is consistent with the color arrangement of a plurality of sub-pixels connected by the second gate scanning signal line G2, so that the expanded data can be transmitted to the plurality of sub-pixels connected by the second gate scanning signal line G2.

Figure 9B:
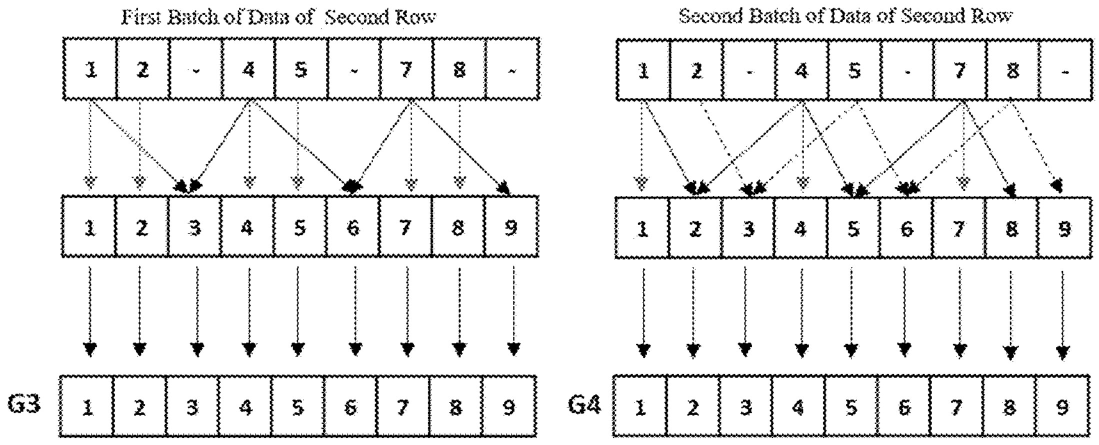
FIG. 9B shows a schematic diagram of transmission of data corresponding to the second row of sub-pixels of the pixel architecture shown in FIG. 2 in the source driver according to at least one embodiment of the present disclosure.

FIG. 9B shows a schematic diagram of transmission of data corresponding to the second row of sub-pixels of the pixel architecture shown in FIG. 2 in the source driver according to at least one embodiment of the present disclosure.

As shown in FIG. 9B, since the arrangement mode for the second row of sub-pixels and the connection mode for the second row of sub-pixels with the data signal lines are the same as those for the first row, the transmission mode for the second row of data in the source driver is the same as the transmission mode for the first row of data and will not be repeated here.

For example, the multiple rows and columns of sub-pixels further include the $(i+r)^{th}$ row of sub-pixels, the first sub-pixel and the second sub-pixel in the $i^{th}$ row of sub-pixels are connected to the first data signal line, and the first sub-pixel and the second sub-pixel in the $(i+r)^{th}$ row of sub-pixels are connected to the second data signal line. The source driver is configured to: in the process of processing initial data corresponding to the $i^{th}$ row of sub-pixels, cache the N pieces of initial data from the first one of the M first cache units; and in the process of processing initial data corresponding to the $(i+r)^{th}$ row of sub-pixels, cache the N pieces of initial data from the second one of the M first cache units, where r is a positive integer.

For example, in the pixel architecture shown in FIG. 2, a cycle of two rows and one jump in the vertical direction is presented, and four rows form one cycle. In each cycle, the first two rows are connected from the first data signal line and the last two rows are connected from the second data signal line. In this way, each row of data in the first two rows of data in each cycle may be cached from the first one of the M first cache units; and each row of data in the last two rows of data in each cycle may be cached from the second one of the M first cache units. In this way, the data can correspond to the physical sub-pixels, so that the embodiments of the present disclosure can be applied to pixel architectures having periodic changes in the vertical direction.

Figure 9C:
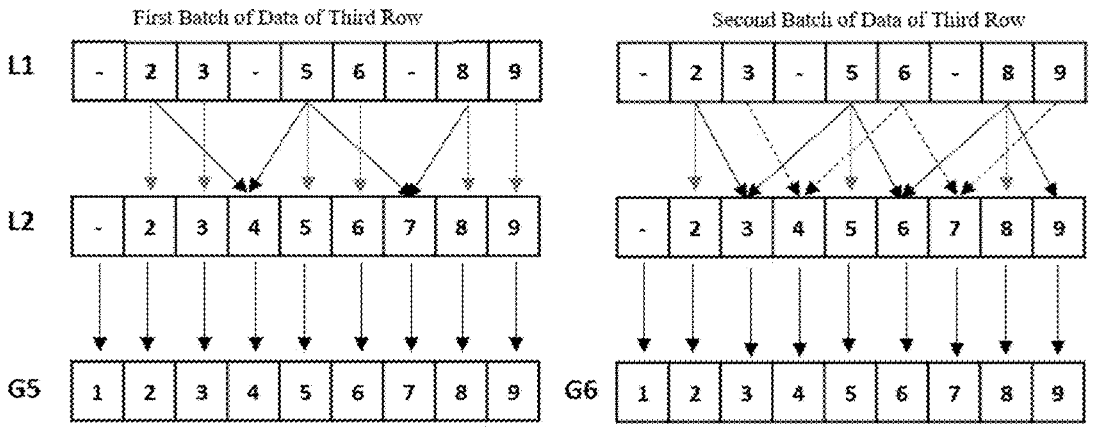
FIG. 9C shows a schematic diagram of transmission of data corresponding to the third row of sub-pixels of the pixel architecture shown in FIG. 2 in the source driver according to at least one embodiment of the present disclosure.

FIG. 9C shows a schematic diagram of transmission of data corresponding to the third row of sub-pixels of the pixel architecture shown in FIG. 2 in the source driver according to at least one embodiment of the present disclosure.

As shown in FIG. 9C, the first batch of data of the third row may include sub-pixel data G3-1/B3-1/G3-2/B3-2/G3-3/B3-3/G3-4/B3-4, etc., shown in FIG. 4, and the data is sequentially stored into channels 2/3/5/6/8/9/11/12 of the first cache module; and so on. The data of each channel of the first cache module is stored into the corresponding channel of the second cache module. The data of channel 2 and the data of channel 5 of the first cache module are averaged to generate G3-1', which is stored into channel 4 of the second cache module; the data of channel 5 and the data of channel 8 of the first cache module are averaged to generate G3-2', which is stored into channel 7 of the second cache module; the data of channel 8 and the data of channel 11 of the first cache module are averaged to generate G3-3', which is stored into channel 10 of the second cache module; and so on. The data, i.e., G3-1/B3-1/G3-1'/G3-2/B3-2/G3-2'/G3-3/B3-3/G3-3', etc., stored by each channel of the second cache module is sent to the corresponding data signal line of the display panel through the digital-to-analog converter and the amplifier. In the above way, the expansion of the horizontal resolution of the first batch of data of the third row is realized, and the color arrangement of the group of data obtained by expansion (i.e., the data cached in the second cache module) is consistent with the color arrangement of a plurality of sub-pixels connected by the fifth gate scanning signal line G5, so that the expanded data can be transmitted to the plurality of sub-pixels connected by the fifth gate scanning signal line G5.

For example, the second batch of data of the third row may include sub-pixel data R3-1/B3-1/R3-2/B3-2/R3-3/B3-3/R3-4/B3-4, etc., shown in FIG. 4, and the data is sequentially stored into channels 2/3/5/6/8/9/11/12 of the first cache module; and so on. The data of channels 2/5/8/11 of the first cache module is stored into the corresponding channels of the second cache module. The data of channel 2 and the data of channel 5 of the first cache module are averaged to generate R3-1', which is stored into channel 3 of the second cache module; the data of channel 5 and the data of channel 8 of the first cache module are averaged to generate R3-2', which is stored into channel 6 of the second cache module; the data of channel 8 and the data of channel 11 of the first cache module are averaged to generate R3-3', which is stored into channel 9 of the second cache module; and so on.

For example, the data of channels 3/6/9/12 of the first cache module is not sent to the corresponding channels of the second cache module. However, the data of channel 3 and the data of channel 6 of the first cache module are averaged to generate B3-1', which is stored into channel 4 of the second cache module; the data of channel 6 and the data of channel 9 are averaged to generate B3-2', which is stored into channel 7 of the second cache module; the data of channel 9 and the data of channel 12 of the first cache module are averaged to generate B3-3', which is stored into channel 10 of the second cache module; and so on.

For example, the data, i.e., R3-1/R3-1'/B3-1'/R3-2/R3-2'/B3-2'/R3-3/R3-3'/B3-3', etc., stored by each channel of the second cache module is sent to the corresponding data signal line of the display panel through the digital-to-analog converter and the amplifier.

In the above way, the expansion of the horizontal resolution of the second batch of data of the third row is realized, and the color arrangement of the group of data obtained by expansion (i.e., the data cached in the second cache module) is consistent with the color arrangement of a plurality of sub-pixels connected by the sixth gate scanning signal line G6, so that the expanded data can be transmitted to the plurality of sub-pixels connected by the sixth gate scanning signal line G6.

Figure 9D:
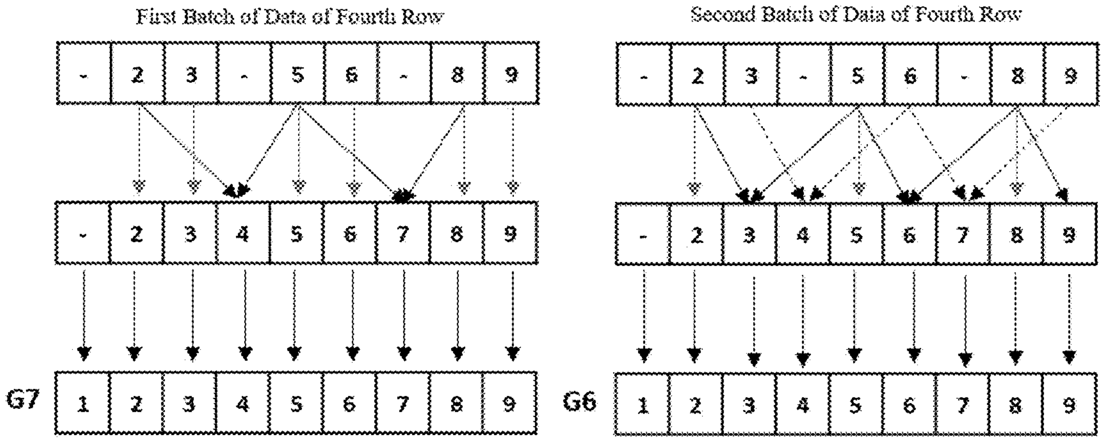
FIG. 9D shows a schematic diagram of transmission of data corresponding to the fourth row of sub-pixels of the pixel architecture shown in FIG. 2 in the source driver according to at least one embodiment of the present disclosure.

FIG. 9D shows a schematic diagram of transmission of data corresponding to the fourth row of sub-pixels of the pixel architecture shown in FIG. 2 in the source driver according to at least one embodiment of the present disclosure.

As shown in FIG. 9D, because the arrangement mode for the fourth row of sub-pixels and the connection mode for the fourth row of sub-pixels with the data signal lines are the same as those for the third row, the transmission mode for the fourth row of data in the source driver is the same as that for the third row of data and will not be repeated here.

For example, the data processing mode for sub-pixel data in the fifth row and subsequent rows shown in FIG. 2 in the source driver can refer to the above FIGS. 9A-9D and related description thereof, and will not be repeated here.

In the above way, the expansion of the horizontal resolution of the pixel architecture shown in FIG. 2 is realized, and the output data is twice as much as the received data. Moreover, by controlling the positions of the original data and the interpolation data in the second cache module, the correctness of displaying is ensured.

Figure 10:
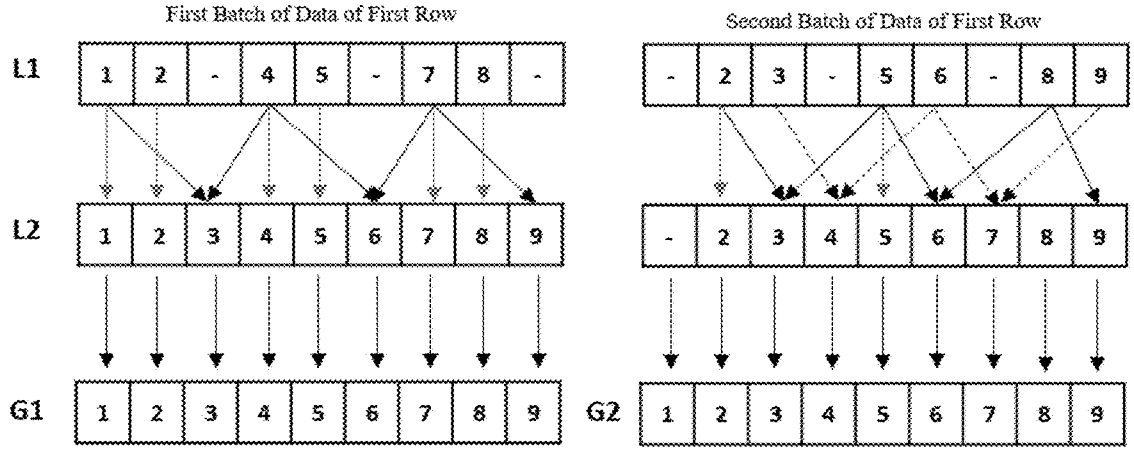
FIG. 10 shows a schematic diagram of transmission of data corresponding to the first row of sub-pixels of the pixel architecture shown in FIG. 3 in the source driver according to at least one embodiment of the present disclosure.

FIG. 10 shows a schematic diagram of transmission of data corresponding to the first row of sub-pixels of the pixel architecture shown in FIG. 3 in the source driver according to at least one embodiment of the present disclosure.

As shown in FIG. 10, the first batch of data of the first row may include sub-pixel data, R1-1/B1-1/R1-2/B1-2/R1-3/B1-3, etc., shown in FIG. 4, and the data is sequentially stored into channels 1/2/4/5/7/8 of the first cache module; and so on. The data of each channel of the first cache module is stored into the corresponding channel of the second cache module. The data of channel 1 and the data of channel 4 of the first cache module are averaged to generate R1-1', which is stored into channel 3 of the second cache module; the data of channel 4 and the data of channel 7 of the first cache module are averaged to generate R1-2', which is stored into channel 6 of the second cache module; the data of channel 7 and the data of channel 10 of the first cache module are averaged to generate R1-3', which is stored into channel 9 of the second cache module; and so on. The data, i.e., R1-1/B1-1/R1-1'/R1-2/B1-2/R1-2'/R1-3/B1-3/R1-3', etc., stored by each channel of the second cache module is sent to the corresponding data signal line of the display panel through the digital-to-analog converter and the amplifier.

For example, the second batch of data of the first row may include sub-pixel data G1-1/B1-1/G1-2/B1-2/G1-3/B1-3, etc., shown in FIG. 4, and the data is sequentially stored into channels 2/3/5/6/8/9 of the first cache module; and so on. The data of channels 2/5/8 of the first cache module is stored into the corresponding channels of the second cache module. The data of channel 2 and the data of channel 5 of the first cache module are averaged to generate G1-1', which is stored into channel 3 of the second cache module; the data of channel 5 and the data of channel 8 of the first cache module are averaged to generate G1-2', which is stored into channel 6 of the second cache module; the data of channel 8 and the data of channel 11 of the first cache module are averaged to generate G1-3', which is stored into channel 9 of the second cache module; and so on.

For example, the data of channels 3/6/9 of the first cache module is not sent to the corresponding channels of the second cache module. However, the data of channel 3 and the data of channel 6 of the first cache module are averaged to generate B1-1', which is stored into channel 4 of the second cache module; the data of channel 6 and the data of channel 9 are averaged to generate B1-2', which is stored into channel 7 of the second cache module; the data of channel 9 and the data of channel 12 of the first cache module are averaged to generate B1-3', which is stored into channel 10 of the second cache module; and so on.

For example, the data, i.e., G1-1/G1-1'/B1-1'/G1-2/G1-2/B1-2'/G1-3/G1-3'/B1-3', etc., stored by each channel of the second cache module is sent to the corresponding data signal line of the display panel through the digital-to-analog (DA) converter and the amplifier.

The data processing mode for sub-pixel data in the second row and subsequent rows shown in FIG. 3 in the source driver can refer to the above FIG. 10 and related description thereof, and will not be repeated here.

In the above way, the expansion of the horizontal resolution of the pixel architecture shown in FIG. 2 is realized, and the output data is twice as much as the received data. Moreover, by controlling the positions of the original data and the interpolation data in the second cache module, the correctness of displaying is ensured.

In accordance with at least one embodiment of the present disclosure, by storing each batch of N pieces of initial data of the dual-gate pixel architecture into the first cache module at intervals and controlling data transmission and interpolation operation between the first cache module and the second cache module through the operation conversion module, the expansion of the horizontal resolution of each batch of N pieces of initial data is realized. In this way, based on at least one embodiment of the present disclosure, the expansion of the horizontal resolution of at least part of the dual-gate pixel architecture is realized. In addition, at least one embodiment of the present disclosure can also be applied to other types of pixel architectures.

For example, the operation converter includes M first switches, K second switches, and K operation units. The inputs of the M first switches are connected to the outputs of the M first cache units, respectively; the output of each of the first switches is connected to one second cache unit and at least one operation unit; and each of the first switches is configured to: according to a control signal, turn off the output of the connected first cache unit, or output the data of the first cache unit to the connected second cache unit, or output the data of the first cache unit to the connected operation unit. The input of each of the operation units is connected to the outputs of at least two of the first switches, and the outputs of the K operation units are connected to the inputs of the K second switches, respectively. The output of each of the second switches is connected to two of the second cache units, and each of the second switches is configured to: according to a control signal, turn off the output of the connected operation unit, or output the data of the operation unit to one of the two connected second cache units. K is a positive integer less than M.

Figure 11:
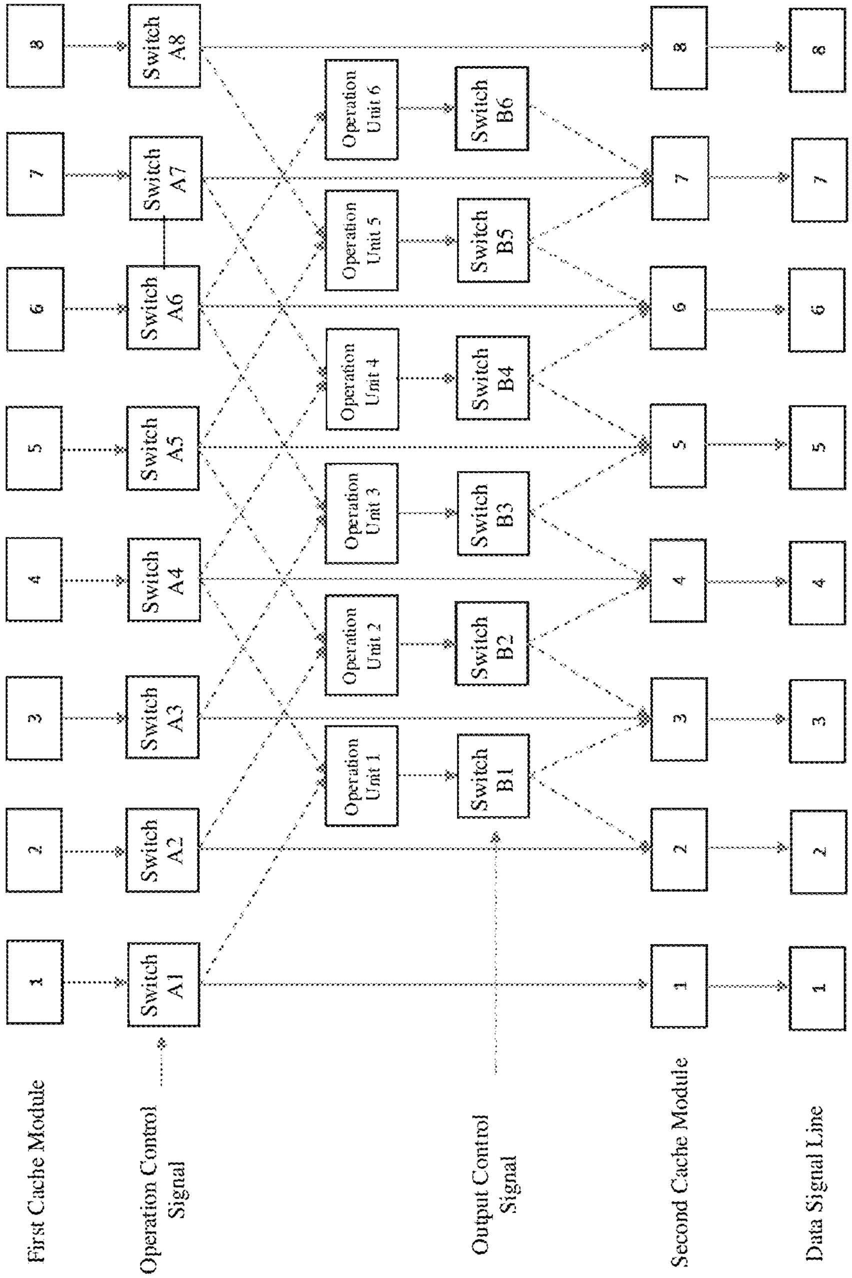
FIG. 11 shows a schematic diagram of an operation converter according to at least one embodiment of the present disclosure.

FIG. 11 shows a schematic diagram of an operation converter according to at least one embodiment of the present disclosure.

As shown in FIG. 11, each of the switches A1-A8 is a first switch, and each of the switches B1-B8 is a second switch. A switch group A (including A1-A8) is connected to the first cache module and the operation unit group, a switch group B (including B1-B8) is connected to the operation unit group and the second cache module, and the second cache module is connected to the data signal lines of the display substrate through the digital-to-analog converter and the amplifier.

For example, the switch group A is connected to an operation control signal, and the switch group B is connected to an output control signal. The switch group A controls whether to output the data of each first cache unit, or not, and output the data to the second cache module or the operation unit according to the operation control signal. The switch group B controls whether to output the result of operation of the operation unit to the second cache module, or not, and output the result to which second cache unit according to the output control signal.

For example, the $j^{th}$ operation unit in the K operation units is connected to the $j^{th}$ first switch and the $(j+3)^{th}$ first switch; and, the $j^{th}$ second switch connected to the $j^{th}$ operation unit is connected to the $(j+1)^{th}$ second cache unit and the $(j+2)^{th}$ second cache unit, where j=1, 2, 3, . . . , K.

For example, as shown in FIG. 11, the operation unit 1 is connected to the switch A1 and the switch A4; the operation unit 2 is connected to the switch A2 and the switch A5; the operation unit 3 is connected to the switch A3 and the switch A6; and so on. The switch B1 is connected to the second cache unit 2 and the second cache unit 3; the switch B2 is connected to the second cache unit 3 and the second cache unit 4; the switch B3 is connected to the second cache unit 4 and the second cache unit 5; and so on.

For example, the K operation units include at least one first operation unit and at least one second operation unit, each first operation unit is used to process the first piece of initial data in two adjacent subgroups, and each second operation unit is used to process the second piece of initial data in two adjacent subgroups.

For example, the controller is further configured to: in the process of processing the first group of initial data, control part of first switches among the M first switches to output two pieces of initial data in each subgroup to two corresponding second cache units and output the first piece of initial data in every two adjacent subgroups to the connected first operation unit, so as to calculate interpolation data by the first operation unit; control a second switching unit connected to each first operation unit to output the interpolation data calculated by the first operation unit to the latter one of two second cache units connected to the second switching unit; and control a second switching unit connected to each second operation units to turn off the output of the second operation unit.

For example, the controller is further configured to: in the process of processing the second group of initial data, control part of first switches among the M first switches to: output the first piece of initial data in each subgroup to one corresponding second cache unit, output the first piece of initial data in every two adjacent subgroups to the connected first operation unit, and output the second piece of initial data in every two adjacent subgroups to the connected second operation unit; control a second switching unit connected to each first operation unit to output the interpolation data calculated by the first operation unit to the former one of two second cache units connected to the second switching unit; and control a second switching unit connected to each second operation unit to output the interpolation data calculated by the second operation unit to the latter one of two second cache units connected to the second switching unit.

For example, with reference to FIG. 9A and FIG. 11, after the first cache module receives the first batch of data of the first row corresponding to the pixel architecture shown in FIG. 2, the operation conversion module performs the following acts.

According to the operation control signal, controlling switches A3/A6/A9 in the switch group A to turn off the outgoing transmission of the data of channels 3/6/9 of the first cache module; controlling switches A2/A5/A8 in the switch group A to send the data of channels 2/5/8 of the first cache module to the corresponding channels of the second cache module; and controlling switches A1/A4/A7 in the switch group A to send the data of channels 1/4/7 of the first cache module to the corresponding channels of the second cache module and also to the corresponding operation units 1/4.

Upon receiving the data, the operation units perform an averaging operation.

According to the output control signal, controlling switches B1 and B4 in the switch group B to send the results of operation of the operation units 1/4 to channels 3/6 of the second cache module; and controlling switches B2/B3/B5/B6 in the switch group B to turn off the outputs of the corresponding operation units.

The second cache module sends the stored data to the corresponding data signal lines of the display panel through the digital-to-analog converter and the amplifier.

With reference to FIG. 9A and FIG. 11, after the first cache module receives the second batch of data of the first row corresponding to the pixel architecture shown in FIG. 2, the operation conversion module performs the following acts.

According to the operation control signal, controlling switches A3/A6/A9 in the switch group A to turn off the outgoing transmission of the data of channels 3/6/9 of the first cache module; controlling switches A1/A4/A7 in the switch group A to send the data of channels 1/4/7 of the first cache module to the corresponding channels of the second cache module and the corresponding operation units 1/4; and controlling switches A2/A5/A8 in the switch group A to send the data of channels 2/5/8 of the first cache module to the corresponding operation units 2/5.

Upon receiving the data, the operation units perform an averaging operation.

According to the output control signal, controlling switches B1 and B4 in the switch group B to send the results of operation of the operation units 1/4 to channels 2/5 of the second cache module, and controlling switches B2 and B5 in the switch group B to send the results of operation of the operation units 2/5 to channels 3/6 of the second cache module; and controlling switches B3 and B6 in the switch group B to turn off the outputs of the operation units 3/6.

The second cache module sends the stored data to the corresponding data signal lines of the display panel through the digital-to-analog converter and the amplifier.

With reference to FIG. 9B and FIG. 11, the acts performed by the first cache module when receiving the second row of data corresponding to the pixel architecture shown in FIG. 2 are the same as those for the first row.

With reference to FIG. 9C and FIG. 11, after the first cache module receives the first batch of data of the third row corresponding to the pixel architecture shown in FIG. 2, the operation conversion module performs the following acts.

According to the operation control signal, controlling switches A1/A4/A7 in the switch group A to turn off the outgoing transmission of the data of channels 1/4/7 of the first cache module; controlling switches A3/A6/A9 in the switch group A to send the data of channels 3/6/9 of the first cache module to the corresponding channels of the second cache module; and controlling switches A2/A5/A8 in the switch group A to send the data of channels 2/5/8 of the first cache module to the corresponding channels of the second cache module and the corresponding operation units 2/5.

Upon receiving the data, the operation units perform an averaging operation.

According to the output control signal, controlling switches B2 and B5 in the switch group B to send the results of operation of the operation units 2/5 to channels 4/7 of the second cache module; and controlling switches B1/B3/B4/B6 in the switch group B to turn off the outputs of the corresponding operation units.

The second cache module sends the stored data to the corresponding data signal lines of the display panel through the digital-to-analog converter and the amplifier.

With reference to FIG. 9C and FIG. 11, after the first cache module receives the second batch of data of the third row corresponding to the pixel architecture shown in FIG. 2, the operation conversion module performs the following acts.

According to the operation control signal, controlling switches A1/A4/A7 in the switch group A to turn off the outgoing transmission of the data of channels 1/4/7 of the first cache module; controlling switches A2/A5/A8 in the switch group A to send the data of channels 2/5/8 of the first cache module to the corresponding channels of the second cache module and the corresponding operation units 2/5; and controlling switches A3/A6/A9 in the switch group A to send the data of channels 3/6/9 of the first cache module to the corresponding operation units 3/6.

Upon receiving the data, the operation units perform an averaging operation.

According to the output control signal, controlling switches B2 and B5 in the switch group B to send the results of operation of the operation units 2/5 to channels 3/6 of the second cache module; controlling switches B3 and B6 in the switch group B to send the results of operation of the operation units 3/6 to channels 4/7 of the second cache module; and controlling switches B1 and B4 in the switch group B to turn off the outputs of the operation units 1/4.

The second cache module sends the stored data to the corresponding data signal lines of the display panel through the digital-to-analog converter and the amplifier.

With reference to FIG. 9D and FIG. 11, the acts performed by the first cache module when receiving the fourth row of data corresponding to the pixel architecture shown in FIG. 2 are the same as those for the third row.

With reference to FIG. 10 and FIG. 11, after the first cache module receives the second batch of data of the first row corresponding to the pixel architecture shown in FIG. 3, the operation conversion module performs the following acts.

According to the operation control signal, controlling switches A3/A6/A9 in the switch group A to turn off the outgoing transmission of the data of channels 3/6/9 of the first cache module; controlling switches A2/A5/A8 in the switch group A to send the data of channels 2/5/8 of the first cache module to the corresponding channels of the second cache module; and controlling switches A1/A4/A7 in the switch group A to send the data of channels 1/4/7 of the first cache module to the corresponding channels of the second cache module and the corresponding operation units 1/4.

Upon receiving the data, the operation units perform an averaging operation.

According to the output control signal, controlling switches B1 and B4 in the switch group B to send the results of operation of the operation units 1/4 to channels 3/6 of the second cache module; and controlling switches B2/B3/B5/B6 in the switch group B to turn off the outputs of the corresponding operation units.

The second cache module sends the stored data to the corresponding data signal lines of the display panel through the digital-to-analog converter and the amplifier.

With reference to FIG. 10 and FIG. 11, after the first cache module receives the second batch of data of the first row corresponding to the pixel architecture shown in FIG. 3, the operation conversion module performs the following acts.

According to the operation control signal, controlling switches A1/A4/A7 in the switch group A to turn off the outgoing transmission of the data of channels 1/4/7 of the first cache module; controlling switches A2/A5/A8 in the switch group A to send the data of channels 2/5/8 of the first cache module to the corresponding channels of the second cache module and the corresponding operation units 2/5; controlling switches A3/A6/A9 in the switch group A to send the data of channels 3/6/9 of the first cache module to the corresponding operation units 3/6.

Upon receiving the data, the operation units perform an averaging operation.

According to the output control signal, controlling switches B2 and B5 in the switch group B to send the results of operation of the operation units 2/5 to channels 3/6 of the second cache module; controlling switches B3 and B6 in the switch group B to send the results of operation of the operation units 3/6 to channels 4/7 of the second cache module; and controlling switches B1 and B4 in the switch group B to turn off the outputs of the operation units 1/4.

The second cache module sends the stored data to the corresponding data signal lines of the display panel through the digital-to-analog converter and the amplifier.

The sending mode for other rows of data of the pixel architecture shown in FIG. 3 is the same as that for the first row of data and will not be repeated here.

For example, in some embodiments, the switch group B may also be controlled by the operation control signal, or the operation control signal and the output control signal may be one signal and are distinguished by different commands. When the first cache module receives data, the data may be stored at a designated position, instead of being stored sequentially. This may be solved by interpolating virtual data into the front end, or by sending an instruction to the source driver for control.

At least one embodiment of the present disclosure provides a hardware super-resolution technology suitable for the dual-gate pixel architecture, including a display panel and a source driver of the dual-gate pixel architecture. Compared with the existing source driver, an operation conversion module is additionally provided, and the operation conversion module is controlled by using an operation control signal and an output control signal. By controlling the position and operation of data stored in the cache at each stage, the horizontal resolution of the display panel of the dual-gate pixel architecture is expanded.

In accordance with at least one embodiment of the present disclosure, by using a plurality of switches and a plurality of operation units, the function of the operation conversion module is realized, while the structure and the control logic are simplified and the reliability is high.

In accordance with at least one embodiment of the present disclosure, the architecture features of the display panel can be as follows: three consecutive sub-pixels of the same color in the same row of pixels are connected to the same gate line or to two gate lines; when they are connected to two gate lines, the first and last sub-pixels are connected to the gate scanning signal line scanned first, while the middle sub-pixel is connected to the gate scanning signal line scanned later.

In accordance with at least one embodiment of the present disclosure, two batches of data are obtained according to one row of pixel data of the display pixel, each batch of data is the data of two types of sub-pixels, and the data of one type of sub-pixels is sent repeatedly.

In accordance with at least one embodiment of the present disclosure, the first cache module stores the data at intervals, but not sequentially. For example, it is possible to store two pieces of data and then reserve one null position, or reserve one null position and then store two pieces of data. For example, periodic switching is also possible. The switching mode is related to whether two sub-pixels between two columns of data signal lines are connected to the same data signal line. In other words, when the two sub-pixels are connected to different data signal lines, periodic switching is required to be performed.

In accordance with at least one embodiment of the present disclosure, when the data stored by the first cache module is the first batch of data corresponding to each physical pixel row, the sub-pixel data arranged ahead will be simultaneously sent to the corresponding channel of the second cache module and the corresponding operation unit, while the sup-pixel data arranged behind will only be sent to the corresponding channel of the second cache module.

In accordance with at least one embodiment of the present disclosure, when the data stored by the first cache module is the second batch of data corresponding to each physical pixel row, the sub-pixel data that is sent repeatedly may be sent to the corresponding operation unit, the sub-pixel data that is not sent repeatedly may be simultaneously sent to the corresponding channel of the second cache module and the corresponding operation unit, and the result of operation is sent to the channel of the second cache module corresponding to the sub-pixel data that is sent repeatedly.

At least one embodiment of the present disclosure also provides an electronic device, including the display apparatus provided in any one of the embodiments of the present disclosure. For example, the electronic device may include a mobile phone, a tablet computer, a TV set, a display, a notebook computer, a digital photo frame, a navigator or any other electronic product with a display function.

At least one embodiment of the present disclosure also provides a control method for a display apparatus. The display apparatus includes a display substrate and a source driver. The display substrate includes multiple rows and columns of sub-pixels arranged in array, a plurality of gate scanning signal lines, and a plurality of data signal lines. The source driver includes M first cache units and M second cache units in one-to-one correspondence to the M first cache units.

Figure 12:
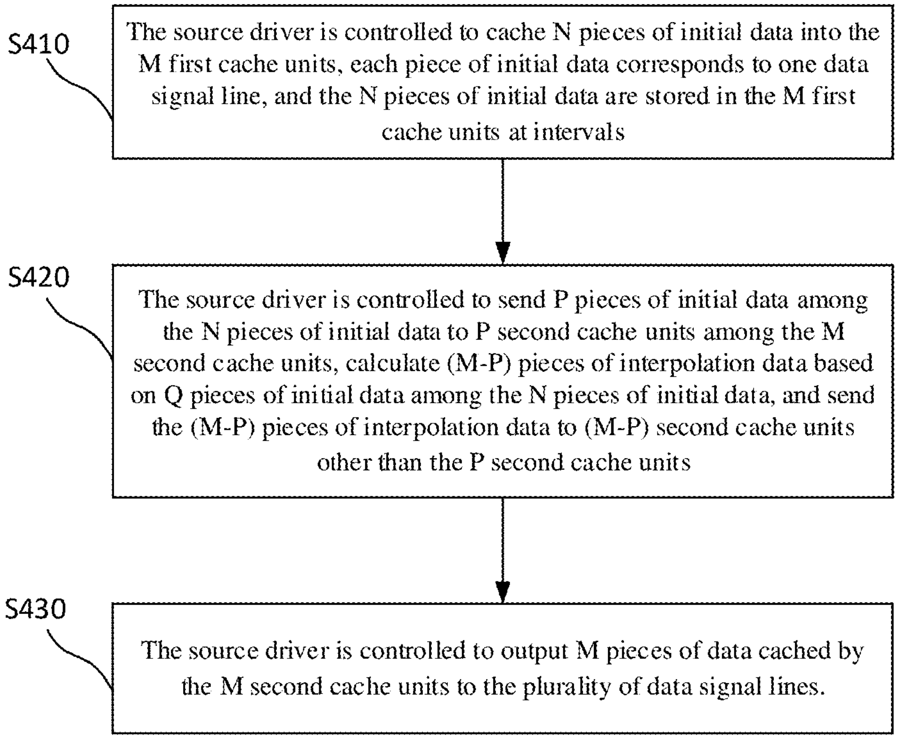
FIG. 12 shows a flowchart of a control method for a display apparatus according to at least one embodiment of the present disclosure.

FIG. 12 shows a flowchart of a control method for a display apparatus according to at least one embodiment of the present disclosure.

As shown in FIG. 12, this method may include steps S410-S430.

In step S410, the source driver is controlled to cache N pieces of initial data into the M first cache units, each piece of initial data corresponds to one data signal line, and the N pieces of initial data are stored in the M first cache units at intervals.

In step S420, the source driver is controlled to send P pieces of initial data among the N pieces of initial data to P second cache units among the M second cache units, calculate (M-P) pieces of interpolation data based on Q pieces of initial data among the N pieces of initial data, and send the (M-P) pieces of interpolation data to (M-P) second cache units other than the P second cache units.

In step S430, the source driver is controlled to output M pieces of data cached by the M second cache units to the plurality of data signal lines.

In accordance with the control method in at least one embodiments of the present disclosure, by storing each batch of N pieces of initial data into the first cache module at intervals and controlling data transmission and interpolation operation between the first cache module and the second cache module through the operation conversion module, the expansion of the horizontal resolution of each batch of N pieces of initial data is realized. Thus, the expansion of the horizontal resolution of at least part of the dual-gate pixel architecture is realized.

The control method in the embodiments of the present disclosure can specifically refer to the related description in the foregoing embodiments and will not be repeated here.

At least one embodiment of the present disclosure also provides an electronic device, including a processor and a memory. The memory includes one or more computer program modules stored thereon. The one or more computer program modules are configured to be executed by the processor to implement the above control method.

Figure 13:
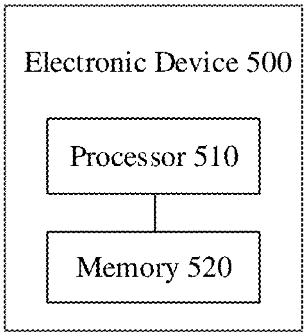
FIG. 13 shows a schematic block diagram of an electronic device according to at least one embodiment of the present disclosure.

FIG. 13 is a schematic block diagram of an electronic device according to some embodiments of the present disclosure. As shown in FIG. 13, the electronic device 500 includes a processor 510 and a memory 520. The memory 520 includes non-transitory computer-readable instructions (e.g., one or more computer program modules) stored thereon. The processor 510 is used to run the non-transitory computer-readable instructions, and one or more steps in the above control method is/are implemented when the non-transitory computer-readable instructions are run by the processor 510. The memory 520 and the processor 510 may be interconnected through a bus system and/or other forms of connection mechanisms (not shown). The specific implementation of each step of the control method and the related explanation can refer to the above embodiments of the control method, and will not be repeated here.

It is to be noted that the components of the electronic device 500 shown in FIG. 13 are only illustrative but not limiting, and the electronic device 500 can have other components according to actual application requirements.

For example, the processor 510 and the memory 520 may communicate with each other directly or indirectly.

For example, the processor 510 and the memory 520 may communicate with each other through a network. The network may include a wireless network, a wired network, and/or any combination thereof. The processor 510 and the memory 520 may also communicate with each other through a system bus, which will not be limited in the present disclosure.

For example, the processor 510 and the memory 520 may be arranged on a server side (or cloud).

For example, the processor 510 may control other components in the electronic device 500 to execute the desired function. For example, the processor 510 may be a central processing unit (CPU), a graphics processing unit (GPU), or other forms of processing units with data processing capability and/or program execution capability. For example, the CPU may be an X86 or ARM architecture, etc. The processor 510 may be a general-purpose processor or a special-purpose processor, and may control other components in the electronic device 500 to execute the desired function.

For example, the memory 520 may include one or more of any combination of computer program products, and the computer program products may include various forms of computer-readable storage mediums, such as volatile memories and/or non-volatile memories. For example, the volatile memories may include random access memories (RAMs) and/or caches, etc. For example, the non-volatile memories may include read-only memories (ROMs), hard disks, erasable programmable read-only memories (EPROMs), portable compact disc read-only memories (CD-ROMs), USB memories, flash memories, etc. The computer-readable storage medium may store one or more computer program modules, and the processor 510 may run the one or more computer program modules to implement various functions of the electronic device 500. The computer-readable storage medium may also store various applications and various data, as well as various data used and/or generated by applications, etc.

For example, in some embodiments, the electronic device 500 may be a mobile phone, a tablet computer, a TV set, a display, a notebook computer, a wearable electronic device, a smart home device, etc. For example, the electronic device 500 may include a display apparatus.

It is to be noted that, in the embodiments of the present disclosure, the specific functions and technical effects of the electronic device 500 can refer to the above description of the control method and will not be repeated here.

Figure 14:
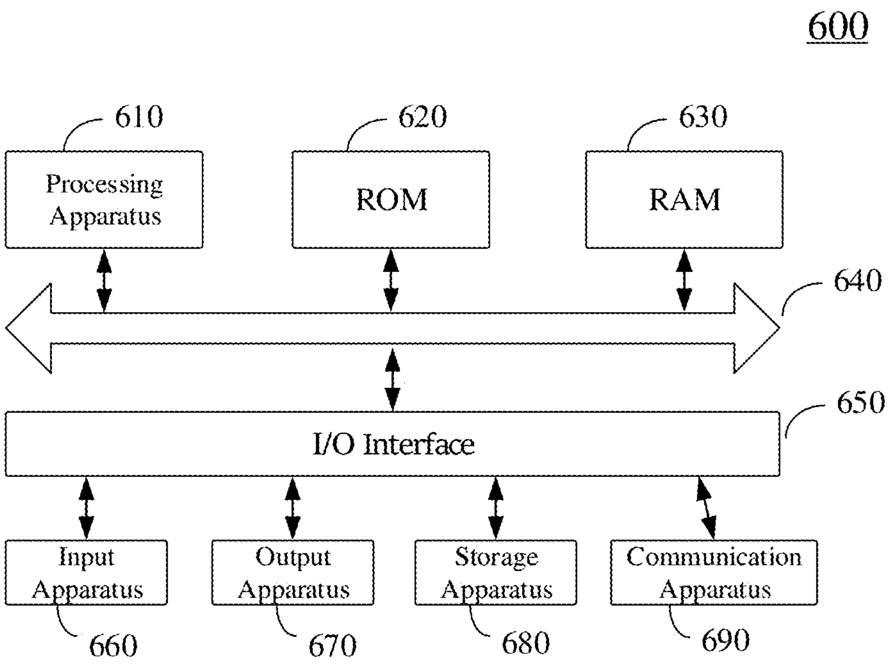
FIG. 14 shows a schematic block diagram of another electronic device according to at least one embodiment of the present disclosure.

FIG. 14 is a schematic block diagram of another electronic device according to some embodiments of the present disclosure. For example, the electronic device 600 is suitable for the implementation of the control method provided in the embodiments of the present disclosure. The electronic device 600 may be a terminal device, etc. It is to be noted that the electronic device 600 shown in FIG. 14 is only an example and will not constitute any limitation to the function and application range of the embodiments of the present disclosure.

As shown in FIG. 14, the electronic device 600 may include a processing apparatus (e.g., a central processor, a graphics processor, etc.) 610, which may execute various appropriate acts and processes according to the programs stored in an ROM 620 or the programs loaded into an RAM 630 from a storage apparatus 680. The RAM 630 may store various programs and data required for the operation of the electronic device 600. The processing apparatus 610, the ROM 620, and the RAM 630 are connected to each other via a bus 640. An input/output (I/O) interface 650 is also connected to the bus 640.

Generally, the following apparatuses may be connected to the I/O interface 650: an input apparatus 660, including, for example, a touch screen, a touch pad, a keyboard, a mouse, a camera, a microphone, an accelerometer, a gyroscope, etc.; an output apparatus 670, including, for example, a liquid crystal display (LCD), a loudspeaker, a vibrator, etc.; a storage apparatus 680, including, for example, a magnetic tape, a hard disk, etc.; and a communication apparatus 690. The communication apparatus 690 may allow the electronic device 600 for wireless or wired communication with other electronic devices to exchange data. Although FIG. 14 shows the electronic device 600 with various apparatuses, it is to be understood that not all the shown apparatuses are required to be implemented or provided and the electronic device 600 can implement or have more or less apparatuses instead.

For example, in accordance with the embodiments of the present disclosure, the above control method may be implemented as a computer software program. For example, an embodiment of the present disclosure includes a computer program product, including a computer program carried on a non-transitory computer-readable medium, and the computer program includes program codes for executing the above control method. In such an embodiment, the computer program may be downloaded and installed from the network through the communication apparatus 690, or installed from the storage apparatus 680, or installed from the ROM 620. When executed by the processing apparatus 610, the computer program can implement the functions defined in the control method provided in the embodiments of the present disclosure.

At least one embodiment of the present disclosure also provides a computer-readable storage medium including non-transitory computer-readable instructions stored thereon, and the non-transitory computer-readable instructions can implement the above control method upon being executed by a computer.

Figure 15:
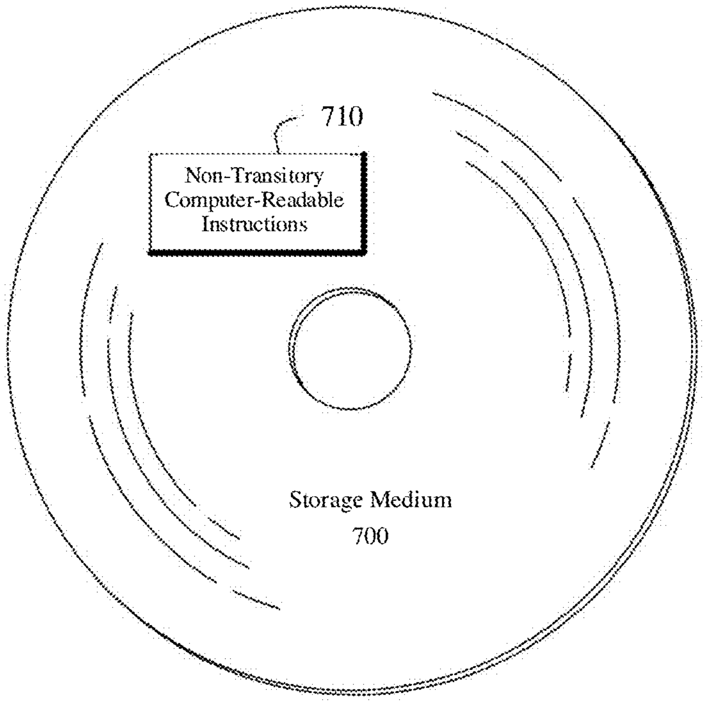
FIG. 15 shows a schematic diagram of a computer-readable storage medium according to at least one embodiment of the present disclosure.

FIG. 15 is a schematic diagram of a storage medium according to some embodiments of the present disclosure. As shown in FIG. 15, the storage medium 700 includes non-transitory computer-readable instructions 710 stored thereon. For example, when executed by a computer, the non-transitory computer-readable instructions 710 implement one or more steps in the above control method.

For example, the storage medium 700 may be applied in the above electronic device 500. For example, the storage medium 700 may be the memory 520 in the electronic device 500 shown in FIG. 13. For example, the related description of the storage medium 700 can refer to the corresponding description of the memory 520 in the electronic device 500 shown in FIG. 13 and will not be repeated here.

The above description is only preferred embodiments of the present disclosure and an explanation of the technical principles applied. Those skilled in the art should understand that the scope of the present disclosure is not limited to technical solutions formed by specific combinations of the above technical features, and should also cover other technical solutions formed by arbitrary combinations of the above technical features or their equivalent features without departing from the above disclosed concept, for example, a technical solution formed by replacing the above features with (but not limited to) technical features with similar functions disclosed in the present disclosure.

In addition, although the operations are depicted in a specific order, this should not be understood as requiring these operations to be executed in the specific order shown or in a sequential order. Under some circumstances, multitasking and parallel processing may be advantageous. Similarly, although several specific implementation details are included in the above discussion, they should not be interpreted as limiting the scope of the present disclosure. Some features described in the context of individual embodiments can also be combined and implemented in a single embodiment. Vice versa, various features described in the context of a single embodiment can also be implemented individually or in any suitable sub-combination in multiple embodiments.

Although the subject matter has been described using language specific to structural features and/or method logic actions, it should be understood that the subject matter defined in the appended claims is not necessarily limited to the specific features or actions described above. The specific features and actions described above are merely exemplary forms of implementing the claims.

There are a few points to note about this disclosure:

1) The drawings of the embodiments of the present disclosure only relate to the structures related to the embodiments of the present disclosure, and other structures may refer to a common design.

2) Without conflicting with each other, the embodiments of the present disclosure and the features therein may be combined with each other to obtain new embodiments.

The above description is only a specific implementation of the present disclosure, but the scope of the present disclosure is not limited thereto. The scope of the present disclosure shall be based on the scope of the claims.

The invention claimed is:

1. A display apparatus, comprising:

a display substrate, comprising multiple rows and columns of sub-pixels arranged in an array, a plurality of gate scanning signal lines and a plurality of data signal lines; and a source driver, comprising:

a first cache module, comprising M first cache units configured to cache N pieces of initial data at intervals, wherein each piece of the initial data corresponds to one of the data signal lines;

a second cache module, comprising M second cache units in a one-to-one correspondence to the M first cache units;

an operation conversion module connected between the first cache module and the second cache module and configured to send P pieces of initial data among the N pieces of initial data to P corresponding second cache units, calculate (M-P) pieces of interpolation data based on Q pieces of initial data among the N pieces of initial data, and send the (M-P) pieces of interpolation data to (M-P) second cache units other than the P corresponding second cache units; and an output module configured to output M pieces of data cached by the M second cache units to the plurality of data signal lines, where M is a positive integer greater than 2, N is a positive integer less than M, and both P and Q are positive integers less than or equal to N, wherein the source driver further comprises an operation converter, the operation converter comprises M first switches, K second switches, and K operation units, inputs of the M first switches are connected to outputs of the M first cache units, respectively, output of each of the first switches is connected to one second cache unit and at least one operation unit, and each of the first switches is configured to: according to a control signal, turn off output of a connected first cache unit, or output data of the first cache unit to a connected second cache unit, or output the data of the first cache unit to a connected operation unit, input of each of the operation units is connected to outputs of at least two first switches, and outputs of the K operation units are connected to inputs of the K second switches, respectively, and output of each of the second switches is connected to two second cache units, and each of the second switches is configured to: according to a control signal, turn off output of a connected operation unit, or output data of the connected operation unit to one of the two connected second cache units, where K is a positive integer less than M, each row of the multiple rows and columns of sub-pixels comprises sub-pixels of multiple colors, and the sub-pixels of multiple colors are cyclically arranged, every two gate scanning signal lines among the plurality of gate scanning signal lines connect one row of sub-pixels, and each of the plurality of data signal lines connects two columns of sub-pixels, and two sub-pixels connected to a same data signal line and connected to two adjacent gate scanning signal lines respectively are sub-pixels of different colors.

2. A display apparatus, comprising:

a display substrate, comprising multiple rows and columns of sub-pixels arranged in an array, a plurality of gate scanning signal lines and a plurality of data signal lines; and a source driver, comprising:

a first cache module, comprising M first cache units configured to cache N pieces of initial data at intervals, wherein each piece of the initial data corresponds to one of the data signal lines;

a second cache module, comprising M second cache units in a one-to-one correspondence to the M first cache units;

an operation conversion module connected between the first cache module and the second cache module and configured to send P pieces of initial data among the N pieces of initial data to P corresponding second cache units, calculate (M-P) pieces of interpolation data based on Q pieces of initial data among the N pieces of initial data, and send the (M-P) pieces of interpolation data to (M-P) second cache units other than the P corresponding second cache units; and an output module configured to output M pieces of data cached by the M second cache units to the plurality of data signal lines;

where M is a positive integer greater than 2, N is a positive integer less than M, and both P and Q are positive integers less than or equal to N, wherein the source driver further comprises an operation converter, the operation converter comprises M first switches, K second switches, and K operation units, inputs of the M first switches are connected to outputs of the M first cache units, respectively, output of each of the first switches is connected to one second cache unit and at least one operation unit, and each of the first switches is configured to: according to a control signal, turn off output of a connected first cache unit, or output data of the first cache unit to a connected second cache unit, or output the data of the first cache unit to a connected operation unit, input of each of the operation units is connected to outputs of at least two first switches, and outputs of the K operation units are connected to inputs of the K second switches, respectively, and output of each of the second switches is connected to two second cache units, and each of the second switches is configured to: according to a control signal, turn off output of a connected operation unit, or output data of the connected operation unit to one of the two connected second cache units, where K is a positive integer less than M, each row of the multiple rows and columns of sub-pixels comprises sub-pixels of multiple colors, and the sub-pixels of multiple colors are cyclically arranged, every two gate scanning signal lines among the plurality of gate scanning signal lines connect one row of sub-pixels, and each of the plurality of data signal lines connects two columns of sub-pixels, and two sub-pixels connected to a same data signal line and connected to two adjacent gate scanning signal lines respectively are sub-pixels of different colors, wherein the multiple rows and columns of sub-pixels comprise an ith row of sub-pixels, and the source driver further comprises a data module configured to:

obtain a first group of initial data and a second group of initial data obtained based on multiple pieces of initial data corresponding to the ith row of sub-pixels, wherein the first group of initial data corresponds to a first part of sub-pixels in the ith row of sub-pixels, the second group of initial data corresponds to a second part of sub-pixels in the ith row of sub-pixels, and wherein the first part of sub-pixels comprises sub-pixels of a first color and sub-pixels of a second color, the second part of sub-pixels comprises sub-pixels of the second color and sub-pixels of a third color, and each group of the first group of initial data and the second group of initial data comprises the N pieces of initial data;

output the first group of initial data to the first cache module at a first moment, so that the first cache module caches the first group of initial data; and output the second group of initial data to the first cache module at a second moment, so that the first cache module caches the second group of initial data, where i is a positive integer, wherein every two pieces of initial data among the N pieces of initial data are stored as a subgroup in two adjacent first cache units, and one first cache unit is spaced between every two subgroups, a jth operation unit in the K operation units is connected to a jth first switch and a (j+3)th first switch, and a jth second switch connected to the jth operation unit is connected to a (j+1)th second cache unit and a (j+2)th second cache unit, where j=1, 2, 3, . . . , K.

3. The display apparatus according to claim 2, wherein the source driver further comprises a controller configured to:

in the process of processing the first group of initial data, control the operation conversion module to output two pieces of initial data in each subgroup to two corresponding second cache units; and control the operation conversion module to calculate a piece of interpolation data based on the first piece of data in every two adjacent subgroups to obtain multiple pieces of interpolation data and output the multiple pieces of interpolation data to other second cache units.

4. The display apparatus according to claim 3, wherein the K operation units comprise at least one first operation unit and at least one second operation unit, each first operation unit is configured to process the first piece of initial data in two adjacent subgroups, and each second operation unit is configured to process the second piece of initial data in two adjacent subgroups;

the controller is further configured to:

in the process of processing the first group of initial data, control part of first switches among the M first switches to output two pieces of initial data in each subgroup to two corresponding second cache units and output the first piece of initial data in every two adjacent subgroups to the connected first operation unit, so as to calculate interpolation data by the first operation unit;

control a second switching unit connected to each first operation unit to output the interpolation data calculated by the first operation unit to the latter one of two second cache units connected to the second switching unit; and control a second switching unit connected to each second operation unit to turn off the output of the second operation unit.

5. The display apparatus according to claim 2, wherein the controller is further configured to:

in the process of processing the second group of initial data, control the operation conversion module to output the first piece of initial data in each subgroup to one corresponding second cache unit;

calculate a piece of interpolation data based on the first piece of initial data in every two adjacent subgroups and output this piece of interpolation data to one second cache unit; and calculate a piece of interpolation data based on the second piece of initial data in every two adjacent subgroups and output this piece of interpolation data to one second cache unit.

6. The display apparatus according to claim 5, wherein the K operation units comprise at least one first operation unit and at least one second operation unit, each first operation unit is configured to process the first piece of initial data in two adjacent subgroups, and each second operation unit is configured to process the second piece of initial data in two adjacent subgroups;

the controller is further configured to:

in the process of processing the second group of initial data, control part of first switches among the M first switches to: output the first piece of initial data in each subgroup to one corresponding second cache unit, output the first piece of initial data in every two adjacent subgroups to the connected first operation unit, and output the second piece of initial data in every two adjacent subgroups to the connected second operation unit;

control a second switching unit connected to each first operation unit to output the interpolation data calculated by the first operation unit to the former one of two second cache units connected to the second switching unit; and control a second switching unit connected to each second operation unit to output the interpolation data calculated by the second operation unit to the latter one of two second cache units connected to the second switching unit.

7. The display apparatus according to claim 2, wherein the multiple rows and columns of sub-pixels further comprise the (i+r)th row of sub-pixels, the first sub-pixel and the second sub-pixel in the ith row of sub-pixels are connected to a first data signal line, and the first sub-pixel and the second sub-pixel in the (i+r)th row of sub-pixels are connected to a second data signal line; and the source driver is configured to:

in the process of processing initial data corresponding to the ith row of sub-pixels, cache the N pieces of initial data from the first one of the M first cache units; and in the process of processing initial data corresponding to the (i+r)th row of sub-pixels, cache the N pieces of initial data from the second one of the M first cache units, where r is a positive integer.

8. The display apparatus according to claim 2, wherein the output module comprises:

a digital-to-analog converter configured to convert signals corresponding to the M pieces of data into analog driving signals; and an amplifier configured to amplify the analog driving signals and then output them to the plurality of data signal lines.

9. A control method for the display apparatus of claim 2, wherein and the method comprises:

controlling the source driver to cache N pieces of initial data into the M first cache units, wherein each piece of the initial data corresponds to one of the data signal lines, and the N pieces of initial data are stored in the M first cache units at intervals;

controlling the source driver to send P pieces of initial data among the N pieces of initial data to P second cache units among the M second cache units, calculating (M-P) pieces of interpolation data based on Q pieces of initial data among the N pieces of initial data, and sending the (M-P) pieces of interpolation data to (M-P) second cache units other than the P second cache units; and controlling the source driver to output M pieces of data cached by the M second cache units to the plurality of data signal lines.

10. An electronic device, comprising:

a processor; and a memory including one or more computer program modules stored thereon, wherein the one or more computer program modules are configured to be executed by the processor to implement the control method according to claim 9.

11. A computer-readable storage medium including non-transitory computer-readable instructions stored thereon that can implement the control method according to claim 9 upon being executed by a computer.

12. An electronic device, comprising a display apparatus, wherein the display apparatus comprises:

a display substrate, comprising multiple rows and columns of sub-pixels arranged in an array, a plurality of gate scanning signal lines and a plurality of data signal lines; and a source driver, comprising:

a first cache module, comprising M first cache units configured to cache N pieces of initial data at intervals, wherein each piece of the initial data corresponds to one of the data signal lines;

a second cache module, comprising M second cache units in one-to-one correspondence to the M first cache units;

an operation conversion module connected between the first cache module and the second cache module and configured to send P pieces of initial data among the N pieces of initial data to P corresponding second cache units, calculate (M-P) pieces of interpolation data based on Q pieces of initial data among the N pieces of initial data, and send the (M-P) pieces of interpolation data to (M-P) second cache units other than the P corresponding second cache units; and an output module configured to output M pieces of data cached by the M second cache units to the plurality of data signal lines;

where M is a positive integer greater than 2, N is a positive integer less than M, and both P and Q are positive integers less than or equal to N, wherein the source driver further comprises an operation converter, the operation converter comprises M first switches, K second switches, and K operation units, inputs of the M first switches are connected to outputs of the M first cache units, respectively, output of each of the first switches is connected to one second cache unit and at least one operation unit, and each of the first switches is configured to: according to a control signal, turn off output of a connected first cache unit, or output data of the first cache unit to a connected second cache unit, or output the data of the first cache unit to a connected operation unit;

input of each of the operation units is connected to outputs of at least two first switches, and outputs of the K operation units are connected to inputs of the K second switches, respectively; and output of each of the second switches is connected to two second cache units, and each of the second switches is configured to: according to a control signal, turn off output of a connected operation unit, or output data of the connected operation unit to one of the two connected second cache units, where K is a positive integer less than M.

13. The electronic device according to claim 12, wherein each row of the multiple rows and columns of sub-pixels comprises sub-pixels of multiple colors, and the sub-pixels of multiple colors are cyclically arranged;

every two gate scanning signal lines among the plurality of gate scanning signal lines connect one row of sub-pixels, and each of the plurality of data signal lines connects two columns of sub-pixels; and two sub-pixels connected to a same data signal line and connected to two adjacent gate scanning signal lines respectively are sub-pixels of different colors.

14. The electronic device according to claim 13, wherein the multiple rows and columns of sub-pixels comprise an ith row of sub-pixels, and the source driver further comprises a data module configured to:

obtain a first group of initial data and a second group of initial data obtained based on multiple pieces of initial data corresponding to the ith row of sub-pixels, wherein the first group of initial data corresponds to a first part of sub-pixels in the ith row of sub-pixels, the second group of initial data corresponds to a second part of sub-pixels in the ith row of sub-pixels, and wherein the first part of sub-pixels comprises sub-pixels of a first color and sub-pixels of a second color, the second part of sub-pixels comprises sub-pixels of the second color and sub-pixels of a third color, and each group of the first group of initial data and the second group of initial data comprises the N pieces of initial data;

output the first group of initial data to the first cache module at a first moment, so that the first cache module caches the first group of initial data; and output the second group of initial data to the first cache module at a second moment, so that the first cache module caches the second group of initial data, where i is a positive integer.

15. The electronic device according to claim 14, wherein every two pieces of initial data among the N pieces of initial data are stored as a subgroup in two adjacent first cache units, and one first cache unit is spaced between every two subgroups;

a jth operation unit in the K operation units is connected to a jth first switch and a (j+3)th first switch; and a jth second switch connected to the jth operation unit is connected to a (j+1)th second cache unit and a (j+2)th second cache unit, where j=1, 2, 3, . . . , K.

16. The electronic device according to claim 15, wherein the source driver further comprises a controller configured to:

in the process of processing the first group of initial data, control the operation conversion module to output two pieces of initial data in each subgroup to two corresponding second cache units; and control the operation conversion module to calculate a piece of interpolation data based on the first piece of data in every two adjacent subgroups to obtain multiple pieces of interpolation data and output the multiple pieces of interpolation data to other second cache units.

17. The electronic device according to claim 16, wherein the K operation units comprise at least one first operation unit and at least one second operation unit, each first operation unit is configured to process the first piece of initial data in two adjacent subgroups, and each second operation unit is configured to process the second piece of initial data in two adjacent subgroups;

the controller is further configured to:

in the process of processing the first group of initial data, control part of first switches among the M first switches to output two pieces of initial data in each subgroup to two corresponding second cache units and output the first piece of initial data in every two adjacent subgroups to the connected first operation unit, so as to calculate interpolation data by the first operation unit;

control a second switching unit connected to each first operation unit to output the interpolation data calculated by the first operation unit to the latter one of two second cache units connected to the second switching unit; and control a second switching unit connected to each second operation unit to turn off the output of the second operation unit.

18. The electronic device according to claim 14, wherein the controller is further configured to:

in the process of processing the second group of initial data, control the operation conversion module to output the first piece of initial data in each subgroup to one corresponding second cache unit;

calculate a piece of interpolation data based on the first piece of initial data in every two adjacent subgroups and output this piece of interpolation data to one second cache unit; and calculate a piece of interpolation data based on the second piece of initial data in every two adjacent subgroups and output this piece of interpolation data to one second cache unit.

19. The electronic device according to claim 18, wherein the K operation units comprise at least one first operation unit and at least one second operation unit, each first operation unit is configured to process the first piece of initial data in two adjacent subgroups, and each second operation unit is configured to process the second piece of initial data in two adjacent subgroups;

the controller is further configured to:

in the process of processing the second group of initial data, control part of first switches among the M first switches to: output the first piece of initial data in each subgroup to one corresponding second cache unit, output the first piece of initial data in every two adjacent subgroups to the connected first operation unit, and output the second piece of initial data in every two adjacent subgroups to the connected second operation unit;

control a second switching unit connected to each first operation unit to output the interpolation data calculated by the first operation unit to the former one of two second cache units connected to the second switching unit; and control a second switching unit connected to each second operation unit to output the interpolation data calculated by the second operation unit to the latter one of two second cache units connected to the second switching unit.

* * * * *